United States Patent
Baumgardner et al.

(10) Patent No.: US 7,893,708 B2
(45) Date of Patent: *Feb. 22, 2011

(54) QUANTUM GATE OPERATIONS WITH A COMMON COUPLED RESONATOR

(75) Inventors: James E. Baumgardner, Odenton, MD (US); Aaron A. Pesetski, Gambrills, MD (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/748,923

(22) Filed: Mar. 29, 2010

(65) Prior Publication Data

US 2010/0182039 A1    Jul. 22, 2010

Related U.S. Application Data

(63) Continuation-in-part of application No. 12/355,562, filed on Jan. 16, 2009, now Pat. No. 7,714,605, which is a continuation of application No. 11/833,902, filed on Aug. 3, 2007, now Pat. No. 7,498,832.

(51) Int. Cl.
   *H03K 19/195* (2006.01)
(52) U.S. Cl. .................. 326/7; 326/2; 326/3; 326/6
(58) Field of Classification Search .............. 326/1–7
   See application file for complete search history.

(56) References Cited

U.S. PATENT DOCUMENTS

| | | | |
|---|---|---|---|
| 4,117,354 A | 9/1978 | Geewala | |
| 4,916,335 A | 4/1990 | Goto et al. | |
| 5,099,152 A | 3/1992 | Suzuki | |
| 5,309,038 A | 5/1994 | Harada et al. | |
| 6,188,236 B1 | 2/2001 | Wikborg | |
| 6,452,520 B1 | 9/2002 | Smith et al. | |
| 6,507,234 B1 | 1/2003 | Johnson et al. | |

(Continued)

FOREIGN PATENT DOCUMENTS

EP    0 467 104 A2    1/1992

(Continued)

OTHER PUBLICATIONS

Gopalakrishnan, et al.: "*Novel Very High IE Structures Based on the Directed BBHE Mechanism for Ultralow-Power Flash Memories*"; IEEE Electron Device Letters, vol. 26, No. 3, Mar. 2005; pp. 212-215.

(Continued)

*Primary Examiner*—Anh Q Tran
(74) *Attorney, Agent, or Firm*—Tarolli, Sundheim, Covell & Tummino LLP

(57) ABSTRACT

Systems and methods are provided for performing a quantum gate operation. A first classical control parameter is associated with a first qubit and coupled to a resonator. The first classical control parameter is transitioned from a first control value to a second control value. The first classical control parameter is returned from the second control value to the first control value via an adiabatic sweep operation, as to permit a transfer of energy between the first qubit and the resonator that causes a change in the quantum state of the qubit and resonator.

24 Claims, 20 Drawing Sheets

U.S. PATENT DOCUMENTS

| | | |
|---|---|---|
| 6,518,673 B2 | 2/2003 | Herr et al. |
| 6,518,786 B2 | 2/2003 | Herr |
| 6,549,059 B1 | 4/2003 | Johnson |
| 6,580,310 B2 | 6/2003 | Herr |
| 6,608,518 B2 | 8/2003 | Furuta et al. |
| 6,617,643 B1 | 9/2003 | Goodwin-Johansson |
| 6,678,540 B2 | 1/2004 | Wire et al. |
| 6,724,216 B2 | 4/2004 | Suzuki et al. |
| 6,750,794 B1 | 6/2004 | Durand et al. |
| 6,777,808 B2 | 8/2004 | Herr et al. |
| 6,836,141 B2 | 12/2004 | Herr |
| 6,865,639 B2 | 3/2005 | Herr |
| 6,909,109 B2 | 6/2005 | Herr |
| 6,917,216 B2 | 7/2005 | Herr |
| 6,960,780 B2 | 11/2005 | Blais et al. |
| 7,135,701 B2 | 11/2006 | Amin et al. |
| 7,170,960 B2 | 1/2007 | Herr |
| 7,230,266 B2 | 6/2007 | Hilton et al. |
| 7,437,533 B2 | 10/2008 | Ichimura et al. |
| 7,447,719 B2 | 11/2008 | Goto et al. |
| 7,498,832 B2 * | 3/2009 | Baumgardner et al. ......... 326/7 |
| 7,541,198 B2 | 6/2009 | Magnus et al. |
| 7,714,605 B2 | 5/2010 | Baumgardner et al. |
| 7,724,020 B2 | 5/2010 | Herr |
| 2006/0091490 A1 | 5/2006 | Chen et al. |
| 2008/0291946 A1 | 11/2008 | Malinovsky |
| 2009/0030962 A1 | 1/2009 | Goto et al. |
| 2009/0078931 A1 | 3/2009 | Berkley |
| 2009/0267635 A1 | 10/2009 | Herr et al. |
| 2010/0044600 A1 | 2/2010 | Ichimura et al. |

FOREIGN PATENT DOCUMENTS

| | | |
|---|---|---|
| WO | WO 2005/093649 A1 | 10/2005 |
| WO | WO 2009/039634 A1 | 4/2009 |

OTHER PUBLICATIONS

Choi, et al.: "*80nm Self-Aligned Complementary I-MOS Using Double Sidewall Spacer and Elevated Drain Structure and Its Applicability to Amplifiers with High Linearity*"; Electron Devices Meeting; Dec. 2004; pp. 8.5.1-8.5.4.

Choi, et al.: "*Novel Tunneling Devices with Multi-Functionality*"; Japanese Journal of Applied Physics; XP-001505882; vol. 46, No. 4B; Apr. 2007; pp. 2632-2625.

Toh, et al.: "*A Novel CMOS Compatible L-Shaped Impact-Ionization MOS (LI-MOS) Transistor*"; International Electron Devices Meeting; Dec. 2005; pp. 951-954.

Garanin, et al.: "*Effects of Nonlinear Sweep in the Landau-Zener-Stueckelberg Effect*"; Physical Review B; Nov. 2002; XP-002514571; vol. 66, No. 17; pp. 174438-1-174438-11.

Wulf, et al.: "*Dressed State of Josephson Phase Qubit Coupled to an LC Circuit*"; IEEE Transactions of Applied Superconductivity; XP-002514572; vol. 15, No. 2; Jun. 2005; pp. 856-859.

Berns, et al.: "*Coherent Quasiclassical Dynamics of a Persistent Current Qubit*"; Physical Review Letters; XP-002514573; vol. 97, No. 15; Oct. 2006; pp. 150502-1-150502-4.

Ortlepp, et al.: "*Experimental Analysis of a New Generation of Compact Josephson-Inductance-Based RSFQ Circuits*"; 11$^{th}$ International Superconductive Electronics Conference; Jun. 10, 2007; 3 pages.

Koch, et all.: "*A NRZ-Output Amplifier for RSFQ Circuits*"; IEEE Transaction on Applied Superconductivity; vol. 9, No. 2; Jun. 1999, pp. 3549-3552.

* cited by examiner

| Point 1 | Point 2 |
|---------|---------|
| $|0,0\rangle$ | $|0,0\rangle$ |
| $|1,0\rangle$ | $|0,1\rangle$ |
| $|0,1\rangle$ | $|0,2\rangle$ |
| $|1,1\rangle$ | $|0,3\rangle$ |

| Point 1 | Point 2 |
|---------|---------|
| \|0,0>  | \|0,0>  |
| \|1,0>  | \|0,1>  |
| \|0,1>  | \|0,3>  |
| \|1,1>  | \|0,2>  |

| Initial | qA: 1 → 2 | qB: 1 → 2 | qA: 2 → 1 | qB: 2 → 1 |
|---|---|---|---|---|
| \|00>\|0> | \|00>\|0> | \|00>\|0> | \|00>\|0> | \|00>\|0> |
| \|01>\|0> | \|01>\|0> | \|00>\|1> | \|10>\|0> | \|10>\|0> |
| \|10>\|0> | \|00>\|1> | \|00>\|2> | \|00>\|1> | \|01>\|0> |
| \|11>\|0> | \|01>\|1> | \|00>\|3> | \|10>\|1> | \|11>\|0> |

| Initial | qA: 1 → 2 | qB Jump | qB: 2 → 1 | qA: 2 → 1 |
|---|---|---|---|---|
| \|00>\|0> | \|00>\|0> | \|00>\|0> | \|00>\|0> | \|00>\|0> |
| \|01>\|0> | \|01>\|0> | \|00>\|1> | \|01>\|0> | \|01>\|0> |
| \|10>\|0> | \|00>\|1> | \|00>\|3> | \|01>\|1> | \|11>\|0> |
| \|11>\|0> | \|01>\|1> | \|00>\|2> | \|00>\|1> | \|10>\|0> |

| Initial | Sweep I: P1-P8 | Sweep II: P1-P8 | Sweep I: P8-P1 | Sweep II: P8-P1 |
|---|---|---|---|---|
| $|g, g, 0\rangle$ | $|g, g, 0\rangle$ | $|g, g, 0\rangle$ | $|g, g, 0\rangle$ | $|g, g, 0\rangle$ |
| $|g, e, 0\rangle$ | $|g, e, 0\rangle$ | $|g, g, 1\rangle$ | $|e, g, 0\rangle$ | $|e, g, 0\rangle$ |
| $|e, g, 0\rangle$ | $|g, g, 1\rangle$ | $|g, g, 2\rangle$ | $|g, g, 1\rangle$ | $|g, e, 0\rangle$ |
| $|e, e, 0\rangle$ | $|g, e, 1\rangle$ | $|g, g, 3\rangle$ | $|e, g, 1\rangle$ | $|e, e, 0\rangle$ |

FIG. 15B

| A_IN | B_IN | A_OUT | B_OUT |
|---|---|---|---|
| 0 | 0 | 0 | 0 |
| 0 | 1 | 1 | 0 |
| 1 | 0 | 0 | 1 |
| 1 | 1 | 1 | 1 |

FIG. 17B

| A_IN | B_IN | C_IN | A_OUT | B_OUT | C_OUT |
|---|---|---|---|---|---|
| 0 | 0 | 0 | 0 | 0 | 0 |
| 0 | 0 | 1 | 0 | 0 | 1 |
| 0 | 1 | 0 | 1 | 1 | 0 |
| 0 | 1 | 1 | 0 | 1 | 1 |
| 1 | 0 | 0 | 1 | 0 | 0 |
| 1 | 0 | 1 | 1 | 1 | 0 |
| 1 | 1 | 0 | 1 | 0 | 1 |
| 1 | 1 | 1 | 1 | 1 | 0 |

FIG. 17D

| Initial | Sweep A: P1-P8 | Sweep B: P1-P8 | Sweep C: P1-P6 | Jump C: P6-P7 | Sweep C: P7-P1 | Sweep B: P8-P1 | Sweep A: P8-P1 |
|---|---|---|---|---|---|---|---|
| $|g,g,0\rangle$ | $|g,g,g,0\rangle$ | $|g,g,g,0\rangle$ | $|g,g,g,0\rangle$ | $|g,g,g,0\rangle$ | $|g,g,g,0\rangle$ | $|g,g,g,0\rangle$ | $|g,g,g,0\rangle$ |
| $|g,e,0\rangle$ | $|g,g,e,0\rangle$ | $|g,g,e,0\rangle$ | $|g,g,e,0\rangle$ | $|g,g,g,1\rangle$ | $|g,g,g,1\rangle$ | $|g,g,g,0\rangle$ | $|g,g,g,0\rangle$ |
| $|e,g,0\rangle$ | $|g,e,g,0\rangle$ | $|g,e,g,0\rangle$ | $|g,g,e,1\rangle$ | $|g,g,g,2\rangle$ | $|g,g,e,1\rangle$ | $|g,g,e,0\rangle$ | $|g,g,e,0\rangle$ |
| $|e,e,0\rangle$ | $|g,e,e,0\rangle$ | $|g,e,e,0\rangle$ | $|g,g,g,3\rangle$ | $|g,g,g,3\rangle$ | $|g,g,e,2\rangle$ | $|g,g,g,1\rangle$ | $|g,e,g,0\rangle$ |
| $|g,g,0\rangle$ | $|e,g,g,0\rangle$ | $|g,g,g,4\rangle$ | $|g,g,g,4\rangle$ | $|g,g,g,4\rangle$ | $|g,g,e,3\rangle$ | $|g,g,e,1\rangle$ | $|g,e,e,0\rangle$ |
| $|g,e,0\rangle$ | $|g,g,e,1\rangle$ | $|g,g,e,2\rangle$ | $|g,g,g,5\rangle$ | $|g,g,g,5\rangle$ | $|g,g,e,2\rangle$ | $|g,g,g,1\rangle$ | $|e,g,g,0\rangle$ |
| $|e,g,0\rangle$ | $|g,e,g,1\rangle$ | $|g,g,g,3\rangle$ | $|g,g,e,0\rangle$ | $|g,g,e,0\rangle$ | $|g,g,e,3\rangle$ | $|g,g,e,1\rangle$ | $|e,g,e,0\rangle$ |
| $|e,e,0\rangle$ | $|g,e,e,1\rangle$ | $|g,g,e,3\rangle$ | $|g,g,e,3\rangle$ | $|g,e,g,1\rangle$ | $|g,e,e,1\rangle$ | $|g,e,g,1\rangle$ | $|e,e,g,0\rangle$ |

| Initial | Sweep I: P1-P8 | Sweep II: P1-P2 | Jump II: P2-P3 | Sweep II: P3-P1 | Sweep I: P8-P1 |
|---|---|---|---|---|---|
| \|g, g, 0> | \|g, g, 0> | \|g, g, 0> | \|g, g, 0> | \|g, g, 0> | \|g, g, 0> |
| \|g, e, 0> | \|g, e, 0> | \|g, g, 1> | \|g, g, 1> | \|g, e, 0> | \|g, e, 0> |
| \|e, g, 0> | \|g, g, 1> | \|g, e, 0> | \|g, e, 0> | \|g, e, 1> | \|e, e, 0> |
| \|e, e, 0> | \|g, e, 1> | \|g, g, 2> | \|g, g, 2> | \|g, g, 1> | \|e, g, 0> |

FIG. 16B

| $A_{IN}$ | $B_{IN}$ | $A_{OUT}$ | $B_{OUT}$ |
|---|---|---|---|
| 0 | 0 | 0 | 0 |
| 0 | 1 | 0 | 1 |
| 1 | 0 | 1 | 1 |
| 1 | 1 | 1 | 0 |

FIG. 17C

| $A_{IN}$ | $B_{IN}$ | $C_{IN}$ | $A_{OUT}$ | $B_{OUT}$ | $C_{OUT}$ |
|---|---|---|---|---|---|
| 0 | 0 | 0 | 0 | 0 | 0 |
| 0 | 0 | 1 | 0 | 0 | 1 |
| 0 | 1 | 0 | 0 | 1 | 0 |
| 0 | 1 | 1 | 0 | 1 | 1 |
| 1 | 0 | 0 | 1 | 0 | 0 |
| 1 | 0 | 1 | 1 | 1 | 0 |
| 1 | 1 | 0 | 1 | 1 | 0 |
| 1 | 1 | 1 | 1 | 0 | 1 |

FIG. 17E

| Initial | Sweep A: P1-P8 | Sweep B: P1-P8 | Sweep C: P1-P5 | Jump C: P5-P6 | Sweep C: P6-P1 | Sweep B: P8-P1 | Sweep A: P8-P1 |
|---|---|---|---|---|---|---|---|
| \|g, g, g, 0⟩ | \|g, g, g, 0⟩ | \|g, g, g, 0⟩ | \|g, g, g, 0⟩ | \|g, g, g, 0⟩ | \|g, g, g, 0⟩ | \|g, g, g, 0⟩ | \|g, g, g, 0⟩ |
| \|g, g, e, 0⟩ | \|g, g, e, 0⟩ | \|g, g, e, 0⟩ | \|g, g, g, 1⟩ | \|g, g, g, 1⟩ | \|g, g, e, 0⟩ | \|g, g, e, 0⟩ | \|g, g, e, 0⟩ |
| \|g, e, g, 0⟩ | \|g, e, g, 0⟩ | \|g, g, g, 1⟩ | \|g, g, g, 2⟩ | \|g, g, g, 2⟩ | \|g, g, g, 1⟩ | \|g, e, g, 0⟩ | \|g, e, g, 0⟩ |
| \|g, e, e, 0⟩ | \|g, e, e, 0⟩ | \|g, g, e, 1⟩ | \|g, g, g, 3⟩ | \|g, g, g, 3⟩ | \|g, g, e, 1⟩ | \|g, e, e, 0⟩ | \|g, e, e, 0⟩ |
| \|e, g, g, 0⟩ | \|e, g, g, 0⟩ | \|g, g, g, 2⟩ | \|g, g, g, 4⟩ | \|g, g, g, 4⟩ | \|g, g, g, 2⟩ | \|g, g, e, 1⟩ | \|e, g, g, 0⟩ |
| \|e, g, e, 0⟩ | \|e, g, e, 0⟩ | \|g, g, e, 2⟩ | \|g, g, g, 5⟩ | \|g, g, g, 5⟩ | \|g, g, e, 2⟩ | \|g, g, g, 1⟩ | \|e, g, e, 0⟩ |
| \|e, e, g, 0⟩ | \|e, e, g, 0⟩ | \|g, g, g, 3⟩ | | | | | |
| \|e, e, e, 0⟩ | (e, e, e) WILL NOT OCCUR AS AN INITIAL CONDITION | | | | | | |

| A$_{IN}$ | B$_{IN}$ | C$_{IN}$ | A$_{OUT}$ | B$_{OUT}$ | C$_{OUT}$ |
|---|---|---|---|---|---|
| 0 | 0 | 0 | 0 | 0 | 0 |
| 0 | 0 | 1 | 0 | 0 | 1 |
| 0 | 1 | 0 | 0 | 1 | 0 |
| 0 | 1 | 1 | 0 | 1 | 1 |
| 1 | 0 | 0 | 1 | 0 | 0 |
| 1 | 0 | 1 | 1 | 1 | 0 |
| 1 | 1 | 0 | 1 | 0 | 1 |
| 1 | 1 | 1 | 1 | 1 | 1 |

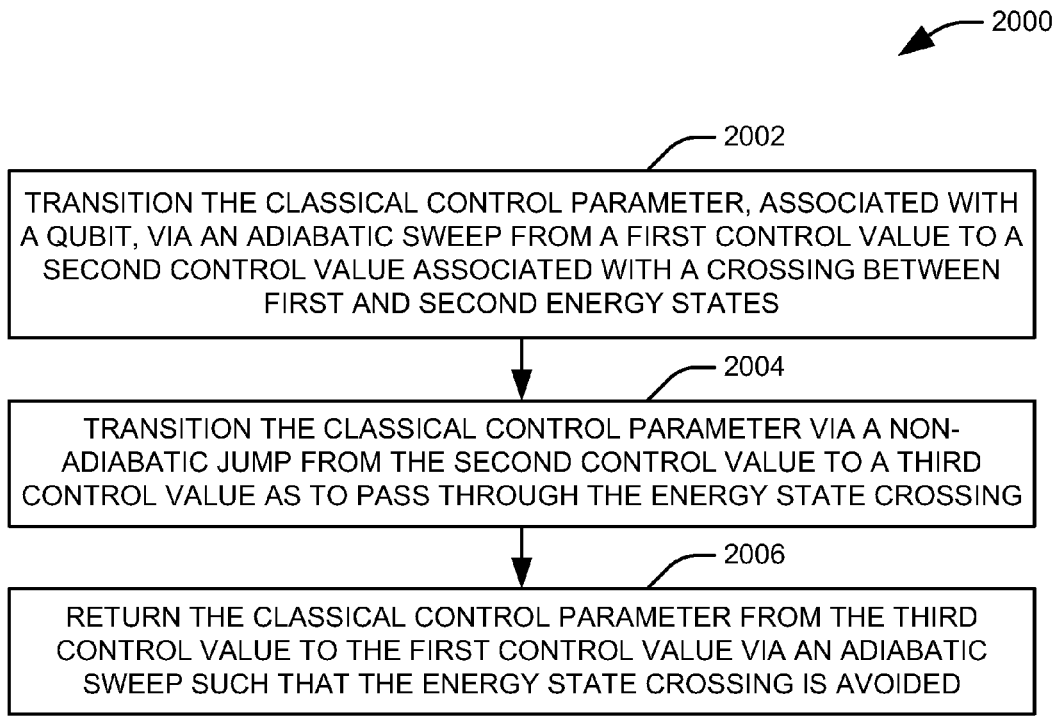

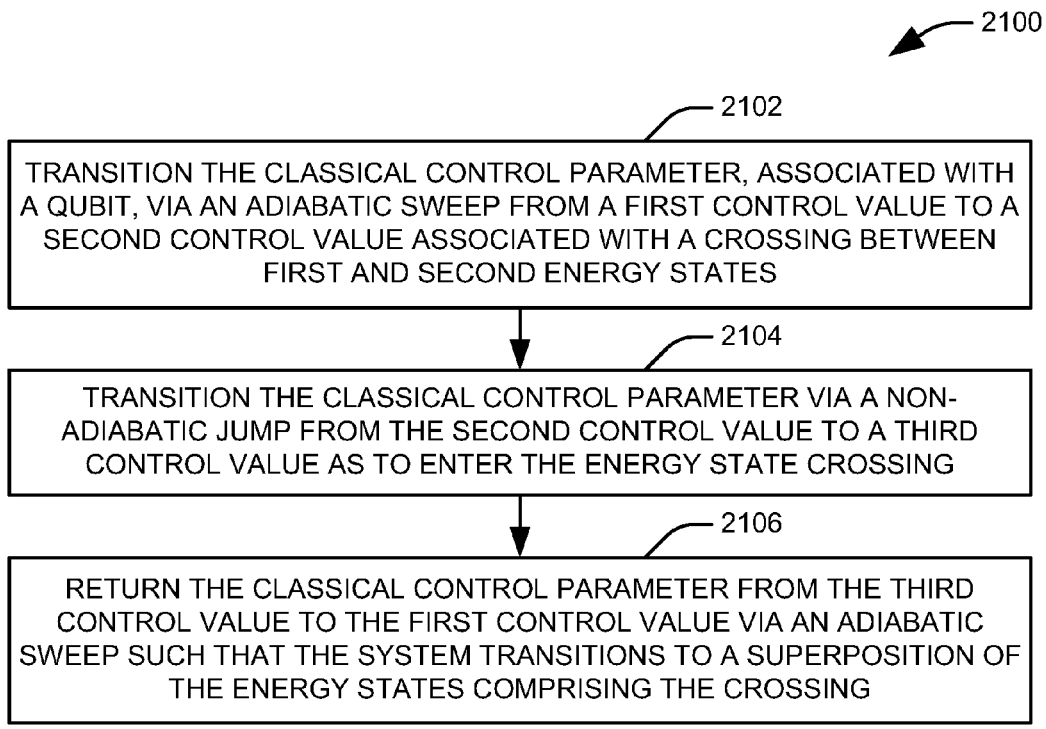

QUANTUM GATE OPERATIONS WITH A COMMON COUPLED RESONATOR

RELATED APPLICATIONS

This application is a continuation-in-part of U.S. patent application Ser. No. 12/355,562 filed Jan. 16, 2009, now U.S. Pat. No. 7,714,605, which is a continuation of U.S. patent application Ser. No. 11/833,902, filed Aug. 3, 2007, now U.S. Pat. No. 7,498,832.

BACKGROUND OF THE INVENTION

1. Field of the Invention

The invention relates generally to quantum computers. More specifically, the invention relates to generating fundamental logical operations in quantum computers.

2. Background of the Invention

A classical computer operates by processing binary bits of information that change state according to the laws of classical physics. These information bits can be modified by using simple logic gates such as AND and OR gates. The binary bits are physically created by a high or a low energy level occurring at the output of the logic gate to represent either a logical one (e.g. high voltage) or a logical zero (e.g. low voltage). A classical algorithm, such as one that multiplies two integers, can be decomposed into a long string of these simple logic gates. Like a classical computer, a quantum computer also has bits and gates. Instead of using logical ones and zeroes, a quantum bit ("qubit") uses quantum mechanics to occupy both possibilities simultaneously. This ability means that a quantum computer can solve a large class of problems with exponentially greater efficiency than that of a classical computer.

SUMMARY OF THE INVENTION

In accordance with an aspect of the present invention, a method is provided for performing a quantum gate operation. A first control parameter associated with a first qubit coupled to a resonator is transitioned from a first control value to a second control value via an adiabatic sweep operation to permit a transfer of energy between the first qubit and the resonator that causes a change in the quantum state of the qubit and resonator. The first control parameter is transitioned from the second control value to a third control value via a jump operation as to maintain the quantum state of the qubit and resonator.

In accordance with another aspect of the present invention, a method for performing a quantum gate operation is provided. A first classical control parameter is associated with a first qubit and coupled to a resonator. The first classical control parameter is transitioned from a first control value to a second control value. The first classical control parameter is returned from the second control value to the first control value via an adiabatic sweep operation, as to permit a transfer of energy between the first qubit and the resonator that causes a change in the quantum state of the qubit and resonator.

In accordance with yet another aspect of the present invention, a method is provided for performing a quantum gate operation. A first classical control parameter is associated with a first qubit and coupled to a resonator. The first classical control parameter is adiabatically swept from a first control value to a second control value, such that the coupled first qubit and resonator enter a quantum state associated with a first energy state of a crossing of the first energy state and a second energy state. The first classical control parameter is jumped from the second control value to a third control value such that the quantum state of the coupled first qubit and resonator jumps through the crossing of the first and second energy states. The first classical control parameter is returned from the third control value to the first control value via an adiabatic sweep operation, such that the quantum state of the coupled first qubit and resonator avoids the crossing of the first and second energy states and transitions to the second energy state.

In accordance with still another aspect of the present invention, a quantum logic gate is provided comprising a resonator and a qubit coupled to the resonator, with a coupling between the qubit and the resonator having a characteristic energy. A classical control mechanism is coupled to the qubit to adjust a quantum state of the qubit by adjusting a value of a classical control parameter associated with the qubit, such that transitioning the classical control parameter slowly relative to the characteristic energy permits a transfer of energy between the qubit and the resonator, and a rapid transition of the classical control parameter relative to the characteristic energy preserves the quantum states of each of the qubit and the resonator.

BRIEF DESCRIPTION OF THE DRAWINGS

The features, objects, and advantages of the invention will become more apparent from the detailed description set forth below when taken in conjunction with the drawings, wherein:

FIG. 15B illustrates a truth table describing the swap gate operation of FIG. 15A.

FIG. 16B illustrates a truth table describing the controlled NOT gate operation of FIG. 16A.

FIG. 17B illustrates a truth table describing a Toffoli gate operation that can be performed according to the method of FIG. 17A.

FIG. 17C illustrates a truth table describing a pseudo-Fredkin gate operation that can be performed according to the method of FIG. 18A.

FIG. 17D illustrates an associated energy state of the quantum circuit at various points during a Toffoli gate operation according to the method described in FIG. 17A.

FIG. 17E illustrates an associated energy state of the quantum circuit at various points in a pseudo-Fredkin gate operation according to the method described in FIG. 17A.

FIG. 20A illustrates an exemplary method for implementing a quantum X gate with a quantum circuit comprising a qubit coupled to a resonator and an associated classical control mechanism.

FIG. 20B illustrates a truth table describing the X gate operation of FIG. 20A.

FIG. 20C illustrates an associated energy state of the quantum circuit at various points in the X gate operation described in FIG. 20A.

FIG. 21A illustrates an exemplary method for implementing a Hadamard gate with a quantum circuit comprising a qubit coupled to a resonator and an associated classical control mechanism.

FIG. 21B illustrates a truth table describing the Hadamard gate operation of FIG. 21A.

FIG. 21C illustrates an associated energy state of the quantum circuit at various points in the Hadamard gate operation described in FIG. 21A.

DETAILED DESCRIPTION OF THE INVENTION

The present invention provides a novel technique for creating fundamental logic gates in a quantum circuit for performing any type of logical operation. This technique allows the logic gates, or quantum gates, to be controlled in a highly accurate manner by classical digital control. The control is "digital" in the sense that the starting point, ending point, and speed of the control signal do not require high precision to achieve a high degree of accuracy in the response of the quantum gates. By eliminating the need for high precision electronic controls, the invention significantly reduces the cost and complexity of quantum computing and makes possible the engineering of a quantum computer.

Figure 1A:
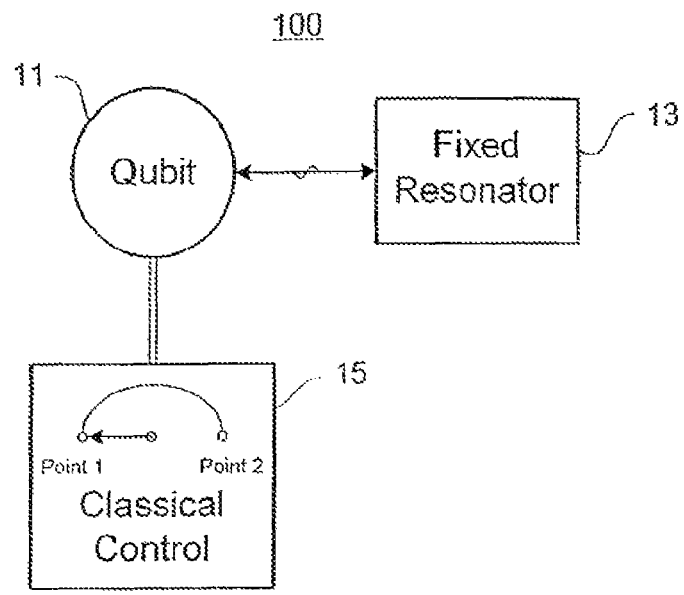
FIG. 1A is a basic block diagram of a quantum circuit according to the invention showing a single qubit with classical control and coupled to a resonator.

FIG. 1A shows a basic block diagram of a quantum circuit or quantum gate 100 according to the invention. Circuit 100 includes a qubit 11 coupled to a fixed resonator 13, and a classical digital control 15 coupled to qubit 11. The coupling between qubit 11 and control 15 is arranged so that the quantum state of qubit 11 may be changed in response to adjustment of a classical control parameter. That is, adjustment of control 15 from Point 1 to Point 2 provides a classical digital control for quantum gate 100. The term "classical" implies that the manner of control behaves generally according to the laws of classical physics.

Figure 1B:
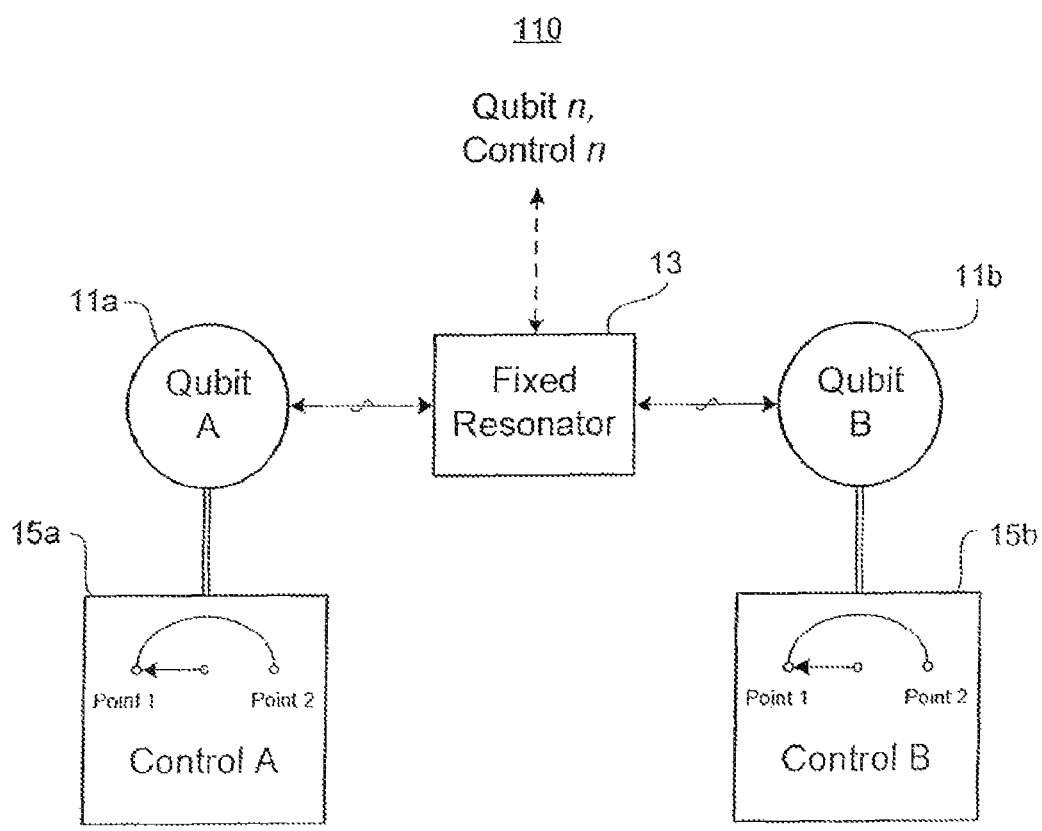
FIG. 1B is a general block diagram of a quantum circuit according to the invention showing an arbitrary number of n qubits, each with classical control and coupled to a common resonator, for performing an arbitrary logical operation.

FIG. 1B shows a general block diagram of a quantum circuit 110 according to the invention, which includes an arbitrary number of n qubits for performing an arbitrary logical operation. All qubits in the circuit are coupled to a common fixed resonator 13. In addition, each qubit is coupled to, and is controllable by, a corresponding classical digital control in the same manner as in circuit 100. For example, qubit 11a corresponds to control 15a, qubit 11b corresponds to control 15b, and each of an arbitrary number of n qubits corresponds uniquely to one of n controls. In the following discussions, for purposes of illustration only, the invention is described in terms of two qubits, denoted qA and qB, coupled to a common resonator r. It shall be understood that various embodiments of the invention may employ much larger numbers and combinations of qubits.

The circuits of FIGS. 1A and 1B have general application in quantum computing, and may be implemented using any quantum circuit technology in which the energy splitting is tunable. For example, a physical implementation of any of qubits 11, 11a, 11b, and 11n may be a Josephson junction, a quantum dot, a SQUID (superconducting quantum interference device), a Cooper pair box, or an ion trap. The choice of resonator 13 is likewise not restricted to a particular technology. A resonator 13 that may be employed in accordance with the basic principles of the invention may be any system having at least two quantum states. Examples of a resonator that satisfy this requirement include, but are not limited to, a transmission line, a resonant cavity, and another qubit. In addition, the coupling of a qubit to a resonator may be accomplished according to the invention using any of various means of physical coupling. For example, the qubit-resonator coupling may be a mechanical coupling by means of an electrical conductor. Alternatively, the qubit-resonator coupling may include, without limitation, capacitive, inductive, magnetic, nuclear, and optical coupling, or any combination of the foregoing.

To best introduce the operating principles of the invention, it is instructive to present the concept of an "avoided crossing" of energy states. This concept is illustrated in the context of the energy diagram of FIG. 2A, which shows energy states that cross, and the energy diagram of FIG. 2B, which shows an avoided crossing of energy states.

Figure 2A:
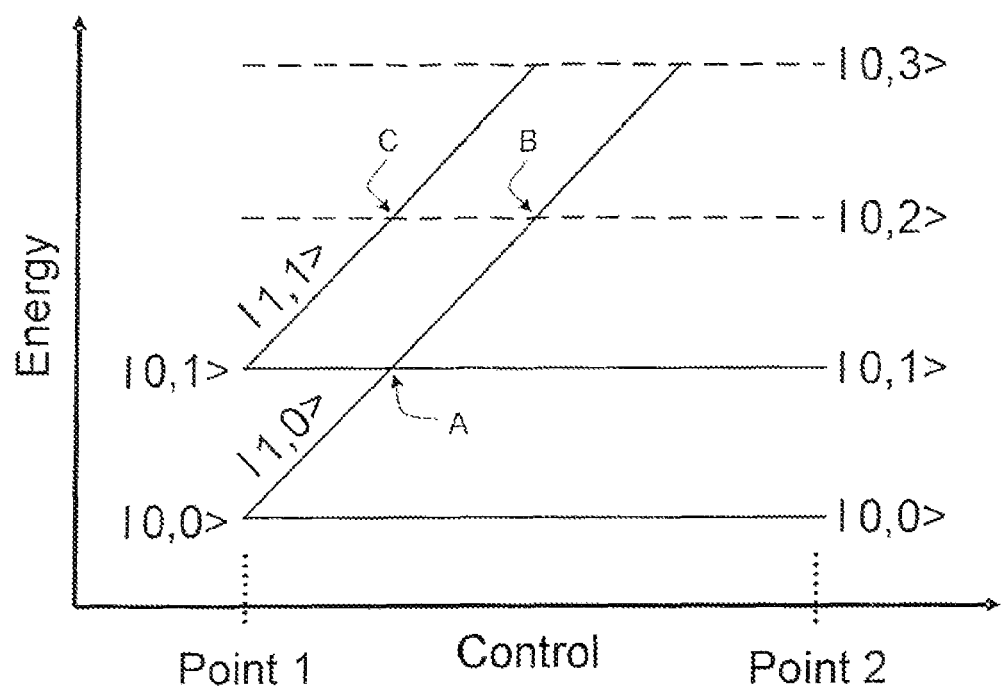
FIG. 2A is an energy diagram for a system having an uncoupled qubit and resonator, showing independent state changes in response to a classical control parameter.

FIG. 2A shows energy states in a system having an uncoupled qubit and resonator. This is an ideal case shown only for the purposes of illustration. In reality, some amount of coupling will exist between the qubit and resonator. Accordingly, in the ideal case shown, changes in energy state of the qubit are independent of changes in energy state of the resonator.

In this diagram and in the energy diagrams that follow, energy states are labeled using the standard Dirac or "bra-ket" notation, wherein the state $|q, r\rangle$ represents the qubit in state $|q\rangle$ and the resonator in state $|r\rangle$. For example, the notation $|1, 0\rangle$ may represent a system having one photon in the qubit and zero photons in the resonator. The vertical axis of the energy diagram represents energy of the given state, relative to the ground energy state. The horizontal axis of the energy diagram represents the control level of the classical control parameter used to adjust the energy state in the qubit. Throughout the disclosure, the term "energy state" refers to a quantum state having a well-defined energy, i.e. the probability of the system having that particular energy closely approaches one hundred percent. The term "quantum state" refers to a complete description of the system, i.e., a function that describes a probability distribution that the system is in a particular scalar/vector state.

In FIG. 2A, because there is no coupling between the qubit and resonator, energy levels simply add together, and the energy states can cross. For example, with the qubit and resonator initially at state $|1,0\rangle$, as the classical control parameter adjusts from Point 1 to Point 2, the energy levels in the uncoupled qubit and resonator remain in the $|1,0\rangle$ state, effectively "crossing" the energy levels at states $|0,1\rangle$ and $|0,2\rangle$. In the diagram, these crossing points are denoted A and B, respectively. Similarly, with the qubit and resonator initially at state $|1,1\rangle$, as the classical control parameter adjusts from Point 1 to Point 2, the energy levels in the uncoupled qubit and resonator remain in the $|1,1\rangle$ state, effectively crossing the energy level at state $|0,2\rangle$. This crossing point is denoted with the letter C.

The classical control parameter tunes the energy levels in the qubit by adjusting between at least two control points, which are labeled as Point 1 and Point 2. For example, in an embodiment that employs a superconducting flux qubit, the classical control parameter may be a flux bias. In an embodiment employing a superconducting phase qubit, the classical control parameter may be a DC current bias. According to the invention, high precision is not required when adjusting the classical control parameter between Point 1 to Point 2. In this sense, the classical control parameter may be considered a digital control.

Figure 2B:
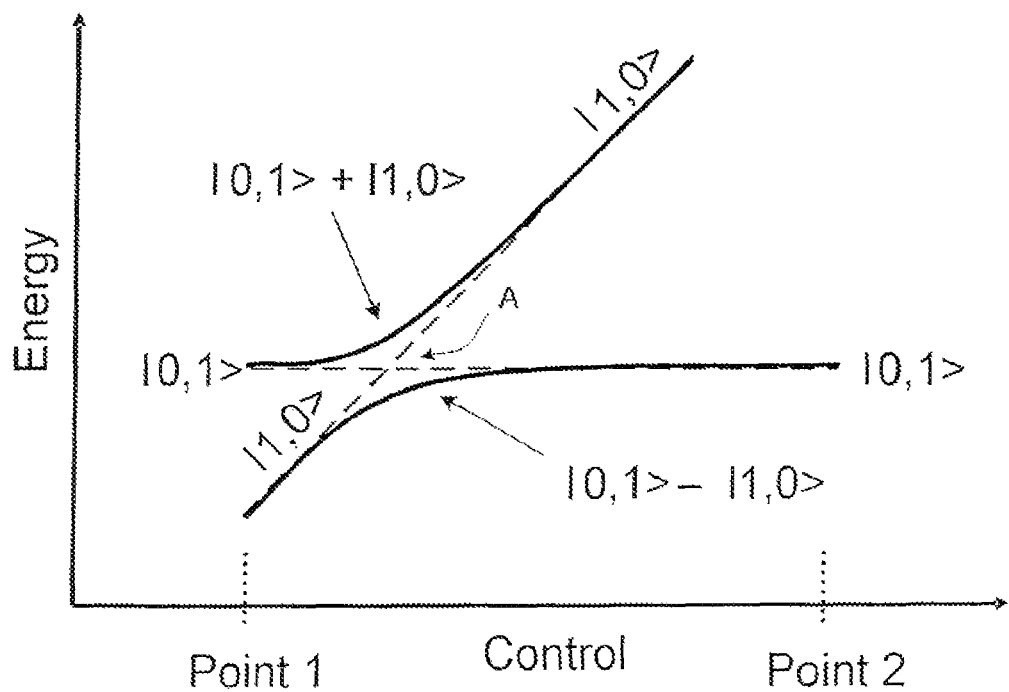
FIG. 2B is an energy diagram for a system having a qubit coupled to a resonator, illustrating the concept of avoided crossing.

FIG. 2B shows energy states in a system having some degree of coupling between the qubit and the resonator. Of particular importance is the behavior of qubit and resonator energy states as the qubit is tuned to a level that would correspond to a crossing point such as A, B or C in the uncoupled case. For example, with qubit and resonator in an initial state of $|1,0\rangle$, as the classical control parameter is swept slowly from Point 1 to a point corresponding to crossing A, the effect of the coupling dominates, and the crossing at point A is avoided. This results from a quantum mechanical effect whereby two systems that are coupled together and that have the same energy will not cross energy lines. Thus, as the classical control parameter sweeps to Point 2, the state of the system tracks the energy line labeled $|0,1\rangle - |1,0\rangle$. This energy line asymptotically approaches the energy line $|0,1\rangle$ of the uncoupled case, which is depicted in FIG. 2B as a dashed line. At point 2, the system assumes the state $|0,1\rangle$. Provided that the sweep of the classical control parameter is adiabatic, the end result is a change of state from $|1,0\rangle$ to $|0,1\rangle$, whereby a photon has been taken from the qubit and transferred to the resonator. In essence, the information has been swapped.

Similarly, as shown in FIG. 2B, with the system in an initial state of $|0,1\rangle$ at Point 1, an adiabatic sweep of the classical control parameter toward Point 2 will track the energy line labeled $|0,1\rangle + |1,0\rangle$. Again, the crossing at A is avoided, and the energy line asymptotically approaches energy line $|1,0\rangle$ of the uncoupled case, depicted in FIG. 2B as a dashed line. At Point 2, the system achieves the state $|1,0\rangle$, effectively swapping information between qubit and resonator.

As described in the foregoing paragraphs, the exchange of information between qubit and resonator occurs when there is an adiabatic sweep of the classical control parameter. This means that the parameter is adjusted very slowly relative to all other relevant time scales. For example, the relevant time scales may be determined according to the coupling strength or according to the size of the energy splitting. In other words, an adiabatic sweep is one that is sufficiently slow to allow the state of the system to follow the energy line in which it started, without allowing it to cross another energy line.

Figure 3A:
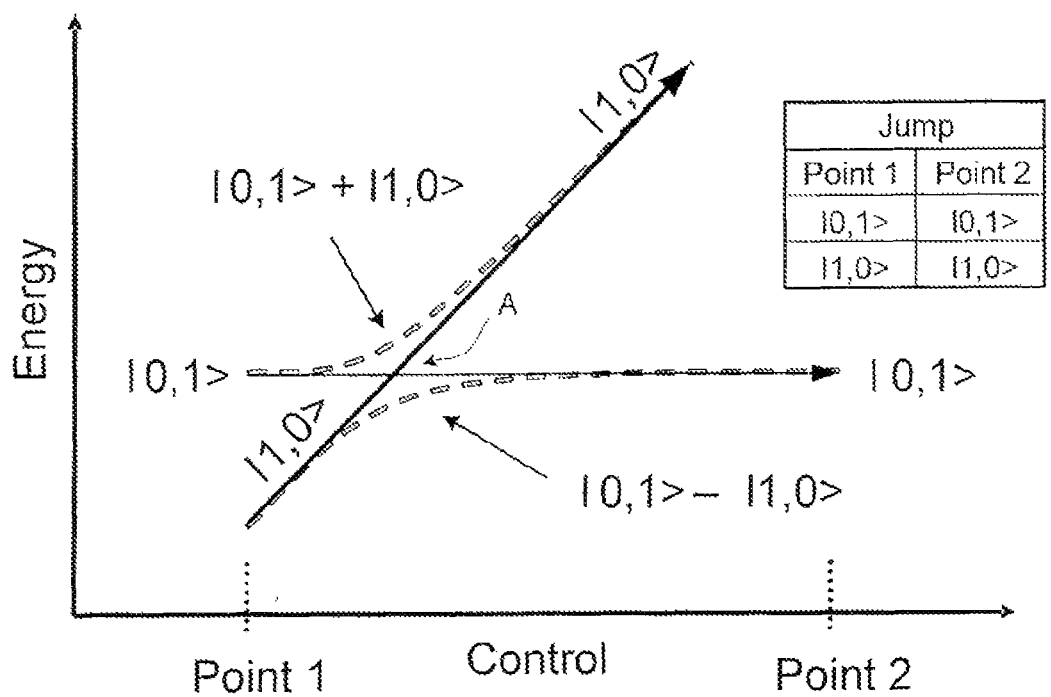
FIG. 3A is an energy diagram for the system of FIG. 2B, with truth table for qubit and resonator logic states, illustrating the concept of a fast jump between control points that preserves the state of the system.

FIG. 3A illustrates an energy diagram for a coupled qubit-resonator system, along with a truth table representing the logic states that correspond to information (e.g. photons) contained in the qubit and resonator. This diagram illustrates the preservation of quantum states when the transition of the classical control parameter between two control points is fast relative to the characteristic energy of the splitting. A fast transition such as this is called a jump operation.

The truth table in FIG. 3A shows the preservation of quantum states in a jump operation. In an initial state of $|1,0\rangle$ with the classical control parameter at Point 1, a rapid transition or jump of the control parameter through the avoided crossing causes no change in quantum state, preserving the $|1,0\rangle$ state of qubit and resonator at Point 2. Similarly, with the classical control parameter at Point 1 and with the qubit and resonator in an initial state of $|0,1\rangle$, a jump through the avoided crossing at point A preserves the $|0,1\rangle$ state of the system at Point 2.

Figure 3B:
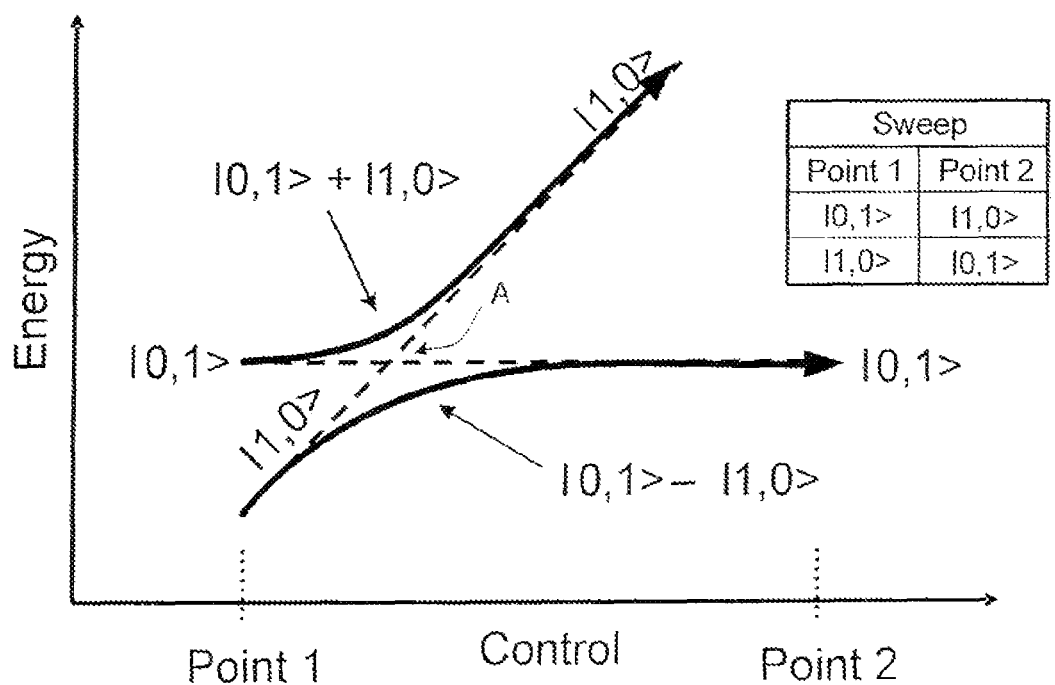
FIG. 3B is the energy diagram for the system of FIG. 2B, showing a truth table for qubit and resonator logic states, illustrating the concept of the adiabatic sweep.

FIG. 3B illustrates an energy diagram for a coupled qubit-resonator system, along with a truth table showing the logic states of the qubit and resonator in response to an adiabatic sweep, or sweep operation. The sweep operation avoids the crossing at point A by following the adiabatic energy contours represented by the solid, curved lines. As shown in the truth table, the sweep operation swaps the initial and final states of qubit and resonator. For example, with the system initially at state $|1,0\rangle$, a sweep of the classical control parameter from Point 1 to Point 2 results in a final state of $|0,1\rangle$. With the system initially at state $|0,1\rangle$, a sweep of the classical control parameter from Point 1 to Point 2 results in a final state of $|1,0\rangle$.

The foregoing concepts of avoided crossing, jump operation, and sweep operation were presented in the context of a single energy crossing. With these concepts firmly in mind, the utility of the present invention is now disclosed in the context of a "full" energy diagram such as that depicted in FIG. 4A. This figure shows the first four energy levels of the coupled qubit-resonator system, as a function of the classical control parameter affecting the quantum state of the qubit. According to the invention, these four energy levels—|0,0>, |0,1>, |1,0>, and |1,1>—are used to manipulate the quantum information of multiple qubits, and thereby form the basis for a quantum logic circuit that may perform an arbitrary quantum operation.

Figures 4A, 4B:
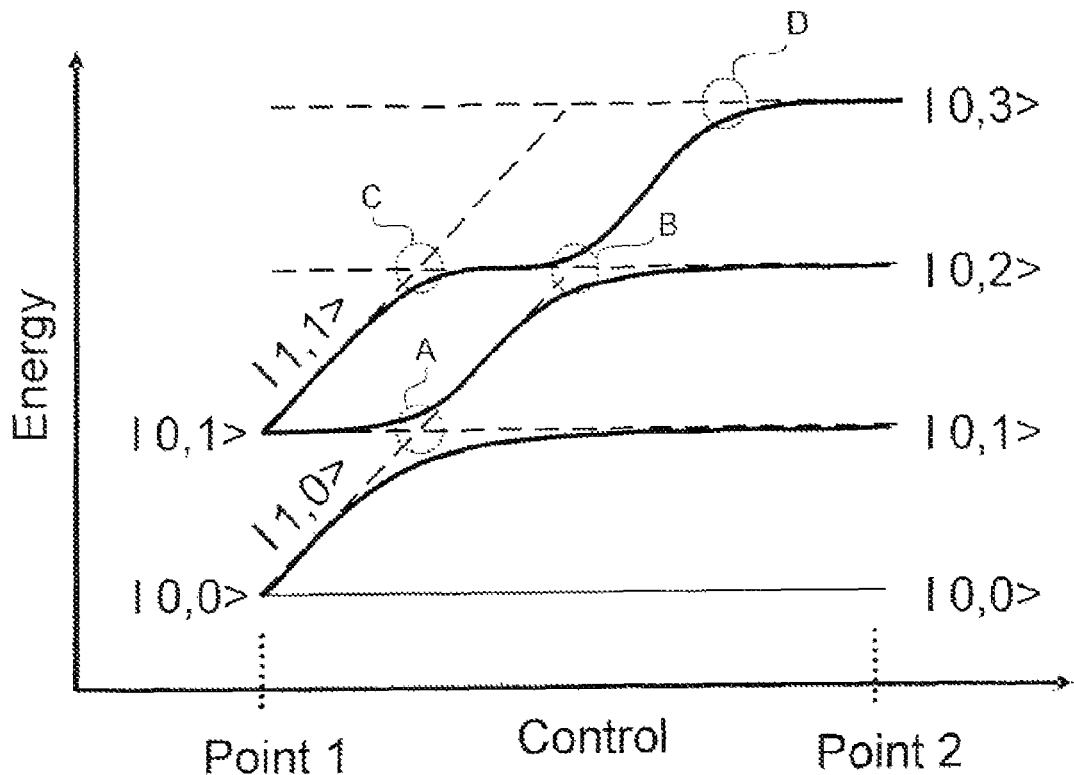
FIG. 4A is an energy diagram showing the first four energy levels of coupled qubit-resonator system changing states responsive to an adiabatic sweep using a classical control parameter according to the invention.
FIG. 4B is a truth table listing qubit and resonator states at each control point for the diagram of FIG. 4A.

FIG. 4A identifies four distinct regions of energy crossings, labeled A, B, C and D. By coupling qubits to a common resonator, each of these energy crossings is an avoided crossing. Therefore, an adiabatic sweep of the classical control parameter through any of these crossings will cause the system to exchange energy states as the energy level avoids the crossing and tracks one of the solid lines. Alternatively, a jump operation by the classical control parameter through any of the avoided crossings will preserve the state of the system as the energy level jumps an energy crossing along the path represented by one of the dashed lines. By manipulating the classical control parameter to combine sweep operations and jump operations in various sequences, different truth tables may be enabled according to the invention.

FIG. 4B illustrates one such truth table. This truth table represents all possible outcomes in the energy diagram of FIG. 4A, where the classical control parameter moves from Point 1 to Point 2 only by adiabatic sweep through the energy crossings. In this case, the system evolves by following the adiabatic energy contours. For example, consider the qubit in an initial state at Point 1. If the resonator is in the |0> state, then an adiabatic sweep of the control line to Point 2 transfers the |0> and |1> states of the qubit into the |0> and |1> states of the resonator, respectively. However, if the resonator is in the |1> state, an adiabatic sweep to Point 2 transfers the |0> and |1> states of the qubit instead to the |2> and |3> states of the resonator. These results are summarized in the truth table of FIG. 4B, which indicates a one-to-one mapping of initial energy states of the system at Point 1 to the resulting energy states of the resonator at Point 2.

Figures 5A, 5B:
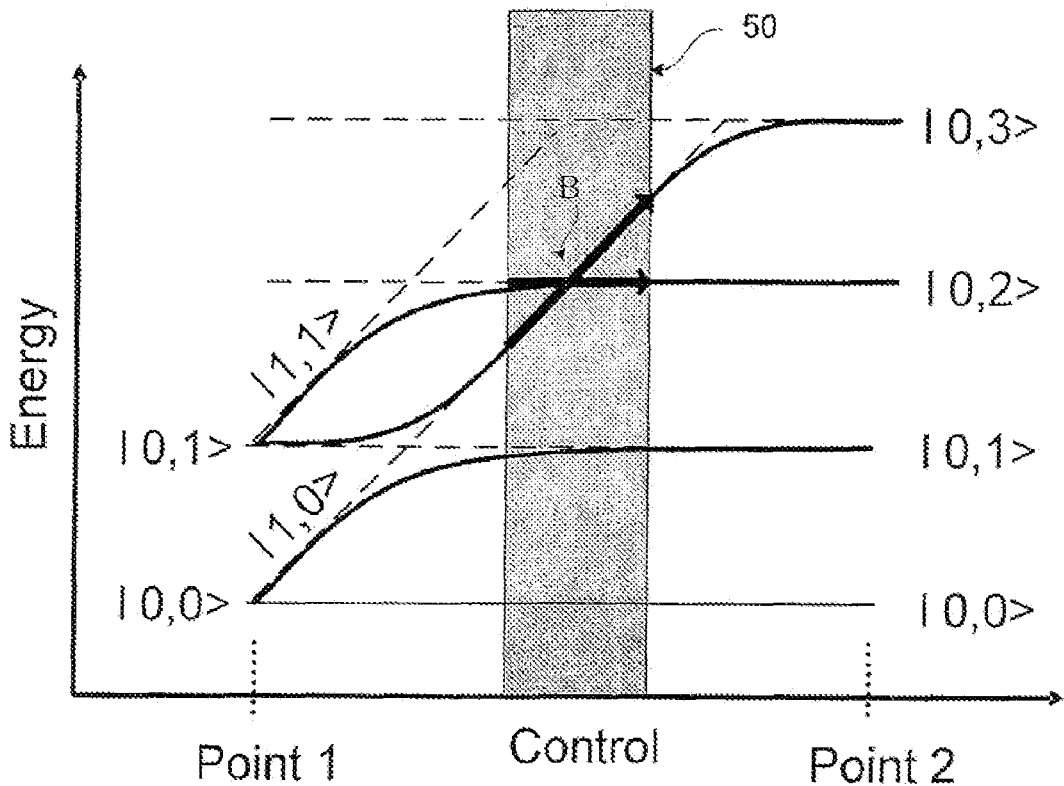
FIG. 5A is an energy diagram showing the first four energy levels of a coupled qubit-resonator system changing states responsive to a fast jump through an energy crossing (point B) using a classical control parameter according to the invention.
FIG. 5B is a truth table listing qubit and resonator states at each control point for the diagram of FIG. 5A

The energy diagram of FIG. 5A provides another example of a logical operation according to the invention. A truth table summarizing all possible outcomes of this operation is given in FIG. 5B. In this operation, the classical control parameter is ramped slowly (i.e. adiabatically) relative to the coupling for all energy crossings, except for the energy crossing B. In the vicinity of the energy crossing B, the classical control parameter applies a jump operation, in the area spanned by the shaded rectangle 50, to force a crossing through point B. In one practical embodiment, this intermediate jump operation may be achieved by engineering the shape of the control pulse for sufficient speed relative to the size of energy crossing B. In another embodiment, the strength of the coupling at crossing B may be engineered to be weaker than the other couplings, while the speed of the control pulse may remain constant. In another embodiment, some combination of control pulse variation and change in coupling strength may be engineered to achieve the desired jump. In any case, the quantum state jumps through crossing B, following the dashed-line path. The net result is that the |2> and |3> states of the resonator at Point 2 are swapped, as indicated by a comparison of the truth table of FIG. 5B to the truth table of FIG. 4B. Note that for the system of FIG. 5A, there is also a one-to-one mapping of initial energy states of the system at Point 1 to the resulting energy states of the resonator at Point 2.

Importantly, for the operations depicted in both FIG. 4A and FIG. 5A, quantum information is not lost. That is, either of these operations may be reversed for complete recovery of the information. It is this fact that allows creation of multiple-qubit logic gates according to the invention. In the embodiments that follow, all qubits are coupled to a single common (or shared) resonator. Also, in the following embodiments, it is assumed that the resonator starts in the ground state, although this is not required in order to practice the invention.

Figure 6:
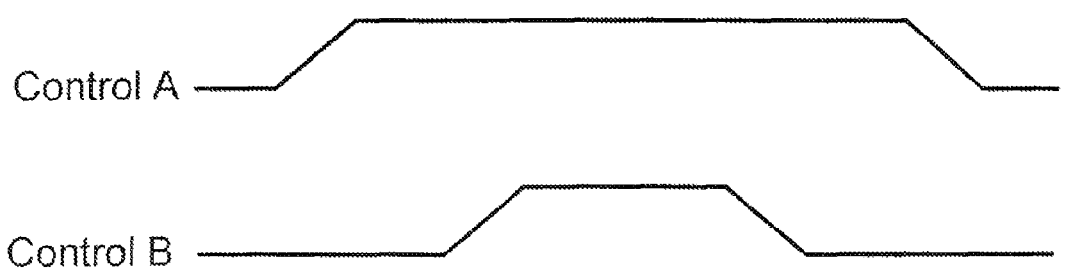
FIG. 6 is a truth table for a STORE operation achieved according to the invention employing two qubits coupled to a common resonator, and showing state changes corresponding to a sequence of control pulse sweeps.

FIG. 6 is a truth table illustrating how an elementary STORE operation may be achieved according to the invention using a quantum circuit having a two-qubit gate. The two qubits, qA and qB, are coupled to a common resonator. Each qubit qA and qB is tunable by a corresponding classical control parameter, where Control A corresponds to qubit qA and Control B corresponds to qubit qB. Energy state notation |qA qB>|r> is used to denote energy levels in qubit qA, qubit qB, and resonator r, respectively.

To achieve the STORE operation, Control A and Control B apply a sequence of control pulses to the qubits, as indicated by the waveforms shown in FIG. 6 below the truth table. An upward slope in a waveform represents a sweep from Point 1 to Point 2, and a downward slope in a waveform represents a sweep from Point 2 to Point 1.

The initial state of the system is shown in the first column of the truth table. Each of the remaining columns corresponds to the state resulting from the following sequence of control pulses: First, the control line of qubit qA is swept adiabatically from Point 1 to Point 2. Considering only qubit qA and ignoring qubit qB, this sweep transfers quantum information into the resonator as shown in the second column of the truth table in the same manner of transfer depicted in FIG. 4A. Then, the control line of qubit qB is swept adiabatically from Point 1 to Point 2. Ignoring qubit qA and considering only qubit qB, this sweep transfers quantum information into the resonator as shown in the third column of the truth table, also according to the manner of transfer depicted in FIG. 4A. The result of these two sweep operations is the transfer of the two-qubit states |0 0>, |0 1>, |1 0>, and |1 1> to the first four states |0>, |1>, |2>, and |3> of the resonator. Thus, quantum information is mapped into the resonator with no loss of information, by sweeping the control line of qubit qA from Point 1 to Point 2, then sweeping the control line of qubit qB from Point 1 to Point 2.

When the information needs to be placed back into qubits qA and qB, the reverse sequence of control pulses may be applied, as indicated in the control waveforms. First, the control line of qubit qB is swept adiabatically from Point 2 to Point 1. Then, the control line of qubit qA is swept adiabatically from Point 2 to Point 1. The resulting energy levels for each of these steps again follows the contours of FIG. 4A, as shown in the final two columns of the truth table. In this manner, a STORE operation may be realized whereby information in the two-qubit gate may be temporarily stored in the resonator, and later returned to the qubits.

Figure 7:
FIG. 7 is a truth table for a SWAP operation achieved according to the invention employing two qubits coupled to a common resonator, and showing state changes corresponding to another sequence of control pulse sweeps.

In another embodiment of the invention, a two-qubit gate may achieve a SWAP operation. This is depicted in FIG. 7, which shows a truth table for the SWAP operation and the corresponding control pulse waveforms. As in previous embodiments, this two-qubit gate consists of qubits qA and qB coupled to a common resonator, where each qubit is independently tunable by a corresponding classical control parameter Control A or Control B. Reading from left to right, the first three columns of the truth table are achieved identically as in the embodiment of FIG. 6.

In the SWAP operation, however, information is retrieved in the same order it was put in. That means that after sweeping Control B from Point 1 to Point 2, the next step is an adiabatic sweep of Control A from Point 2 to Point 1, followed by an adiabatic sweep of Control B from Point 2 to Point 1. The effect of these sweeps is shown in the truth table in the fourth and fifth columns, respectively. The result of this sequence is that the quantum state stored in qubit qA is swapped with the quantum state stored in qubit qB. An important feature is that since more than two qubits can be coupled to the same resonator, this allows for the realization of more complicated circuits according to the invention, such as a quantum shift register. For example, the state in qubit qA may be swapped to qubit qB, which in turn may be swapped to a third qubit qC, etc.

In the foregoing embodiments that achieve the STORE and SWAP operations, adjustment of the classical control parameter between any two control points was effected only by means of an adiabatic sweep. That is, the control flux, DC bias current, or other control parameter was changed slowly with respect to the size of the coupling between the qubits and the resonator. In a two-qubit circuit where the qubits are coupled to a common resonator and tunable by classical control parameters, a logical CNOT operation may be achieved by combining sweep operations as described in FIG. 4A with at least one jump operation as described in FIG. 5A.

Figure 8:
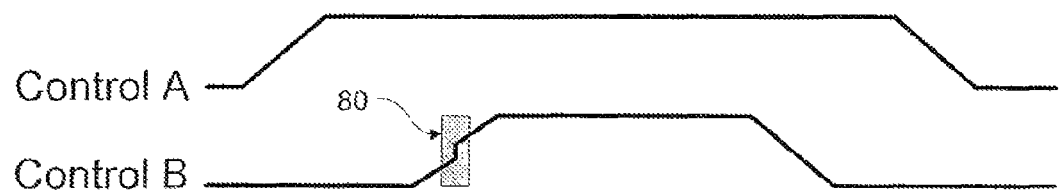
FIG. 8 is a truth table for a CNOT operation achieved according to the invention employing two qubits coupled to a common resonator, and showing state changes corresponding to a combination of control pulse sweep and jump operations.

FIG. 8 is a truth table for a CNOT operation according to the invention, showing state changes corresponding to a combination of control pulse sweep and jump operations. The waveforms corresponding to adjustment of classical control parameters Control A and Control B are shown below the truth table.

The first pulse in the sequence of pulses in FIG. 8 is identical to that of FIG. 6, wherein quantum information in qubit qA is transferred to the resonator by an adiabatic sweep of Control A from control Point 1 to control Point 2. The second pulse in the sequence, however, is a jump operation applied by Control B, as indicated in shaded location 80. When information in qubit qB is transferred into the resonator, crossing B in FIG. 5A is jumped over, modifying the truth table of FIG. 8 according to the pattern of FIG. 5B, as shown in the third column under "qB Jump". The next control pulse in the sequence is an adiabatic sweep of Control B from Point 2 to Point 1, followed by an adiabatic sweep of Control A from Point 2 to Point 1. These sweeps alter the truth table according to the pattern of FIG. 4A.

The end result of this sequence is shown in the final column of the truth table of FIG. 8. As shown, the state of qubit qA controls whether or not the state in qubit qB is flipped. If qubit qA is one, qubit qB is flipped. If qubit qA is zero, qubit qB is not flipped. This is precisely the truth table of a CNOT operation.

Figure 9:
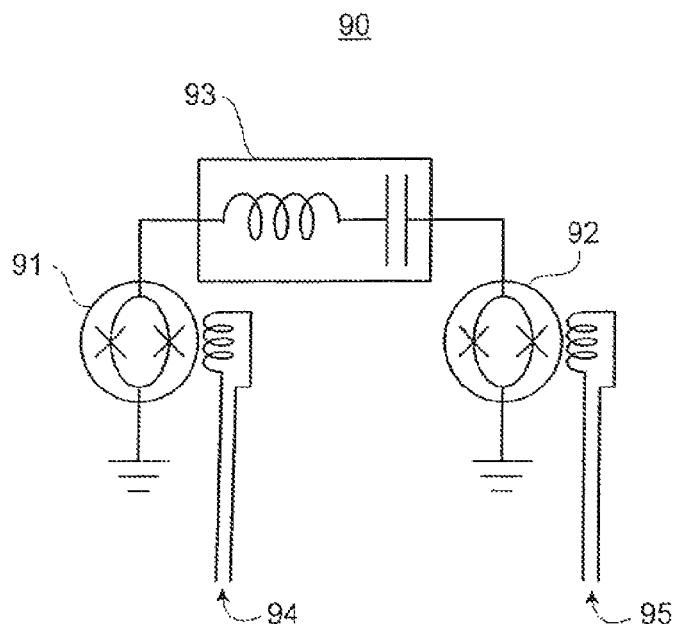
FIG. 9 is a block diagram of a quantum circuit according to the invention having multiple qubits coupled to a common resonator for performing an arbitrary logical operation.

A more specific implementation example of a system according to the invention is shown in the block diagram of FIG. 9 as a quantum circuit 90. Circuit 90 includes two qubits, 91 and 92, each coupled to a common resonator 93, and each controllable by respective classical digital controls 94 and 95. Qubits 91 and 92 may correspond to qubits qA and qB described in the foregoing embodiments. Circuit 90 may therefore function as a fundamental quantum gate for performing SWAP or CNOT operations, depending on how controls 94 and 95 are manipulated. Thus circuit 90, either alone or in some combination with similar gates, may perform an arbitrary logical operation according to the invention. In this embodiment, qubits 91 and 92 are each modeled as a DC SQUID, resonator 93 is modeled as a series LC circuit or LC circuit component, and controls 94 and 95 are each modeled as an electrical circuit magnetically coupled to a respective qubit, each providing a flux bias as a means of control. The flux bias may be created in response to another control signal elsewhere in the computer system. For example, in response to a classical computer processor executing an algorithm stored in a classical computer memory, a transistor or other classical electronic device may change state to energize control circuit 94 or 95. Herein, a classical computer memory means any conventional processor-readable or computer-readable memory, such as a hard disk, flash memory, or other magnetic or optical storage device.

Throughout the foregoing disclosure, various methods according to the invention for creating quantum logic gates are implied. The following embodiments are provided to expressly illustrate methods for implementing quantum logic operations according to the invention. These methods may be embodied, in whole or in part, as processing steps stored in a classical computer memory and executable by a classical computer processor for manipulating a quantum circuit according to the invention, for example, according to a process as described in the previous paragraph.

Figure 10:
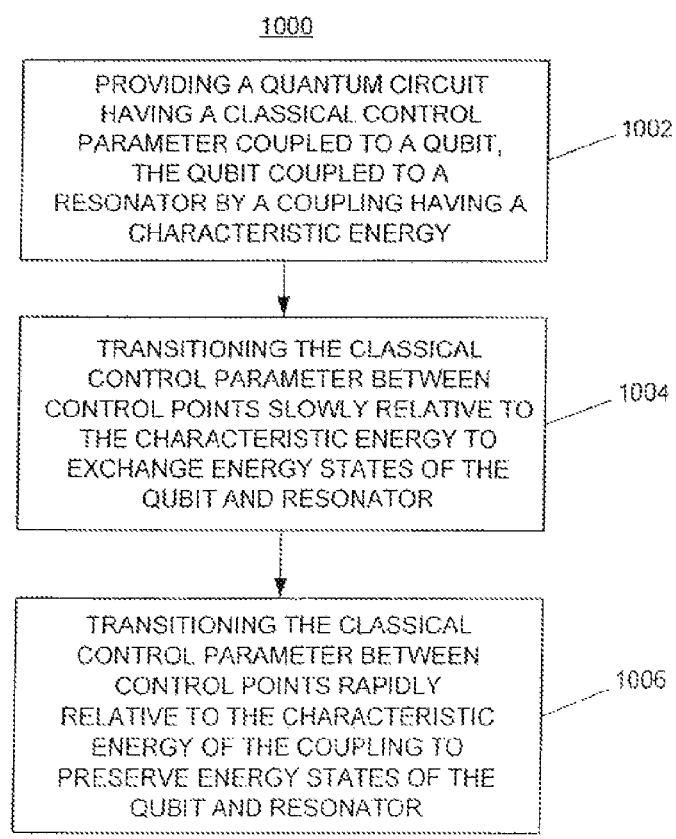
FIG. 10 is a flow diagram illustrating an embodiment of a method according to the invention for creating a quantum logic gate.

The first of these methods is method 1000 shown in FIG. 10. Method 1000 begins with an initial step 1002, which provides a quantum circuit having a classical control parameter coupled to a qubit, wherein the qubit is coupled to a resonator by a coupling having a characteristic energy. This step is followed by step 1004, in which the classical control parameter is transitioned between control points, e.g. Point 1 and Point 2, slowly relative to the characteristic energy of the coupling to cause an exchange of energy states between the qubit and the resonator. In the final step 1006, the classical control parameter is transitioned between the control points rapidly relative to the characteristic energy of the coupling to preserve the energy states of the qubit and resonator. The sequence of steps 1004 and 1006 may be reversed, to achieve a desired quantum operation.

Figure 11:
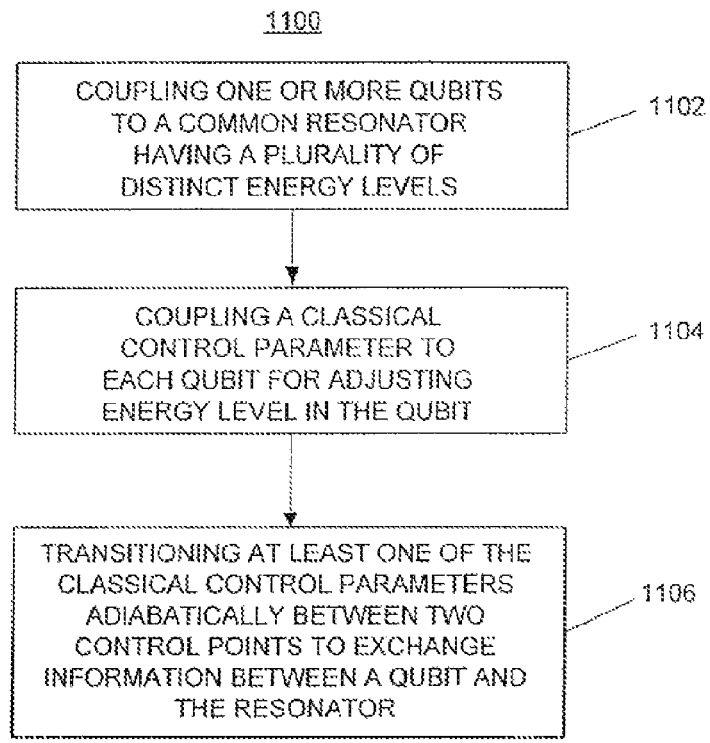
FIG. 11 is a flow diagram illustrating an embodiment of a method according to the invention for performing a quantum gate operation.

Another embodiment of a method according to the invention is method 1100 shown in the flow diagram of FIG. 11. In the first step 1102, one or more qubits are coupled to a common resonator. A requirement of this step is that the resonator have a plurality of distinct energy levels. In the next step 1104, a classical control parameter is coupled to each qubit in a manner that allows for adjustment of the energy level in the qubit in response to a change in the classical control. In this step, each qubit is coupled to one and only one classical control. In the final step 1104, at least one of the classical control parameters is transitioned adiabatically between two control points to exchange information between a qubit and the resonator.

Figure 12:
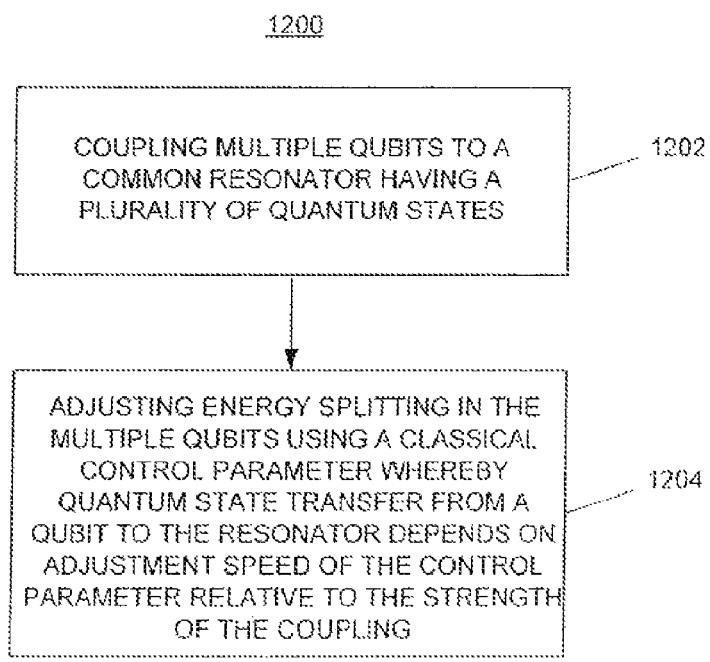
FIG. 12 is a flow diagram illustrating another embodiment of a method according to the invention for creating a quantum logic gate.

Another method according to the invention is method 1200 illustrated in the flow diagram of FIG. 12. Method 1200 begins with an initial step 1202, in which multiple qubits are coupled to a common resonator, the resonator having a plurality of quantum states. In one implementation, the resonator has four quantum states. In the next and final step 1204, energy splitting in the multiple qubits is adjusted using a classical control parameter adjustable between first and second control points. In this step, energy state transfer from a qubit to the common resonator depends on adjustment speed of the control parameter between the control points, relative to the strength of the coupling.

By carefully controlling the energy splitting in two qubits coupled to a common resonator, a method according to the invention may achieve a CNOT operation on a quantum scale. When combined with single qubit operations known in the art, this invention makes possible a complete set of quantum gates. Every multiple qubit operation may be decomposed into a string of control pulses to multiple qubits coupled to a common resonator. Thus, in a quantum circuit according to the invention, the changes in energy states may provide logic gates comprising a quantum computer, enabling all possible quantum calculations by detection of state changes in a qubit or resonator.

Figure 13:
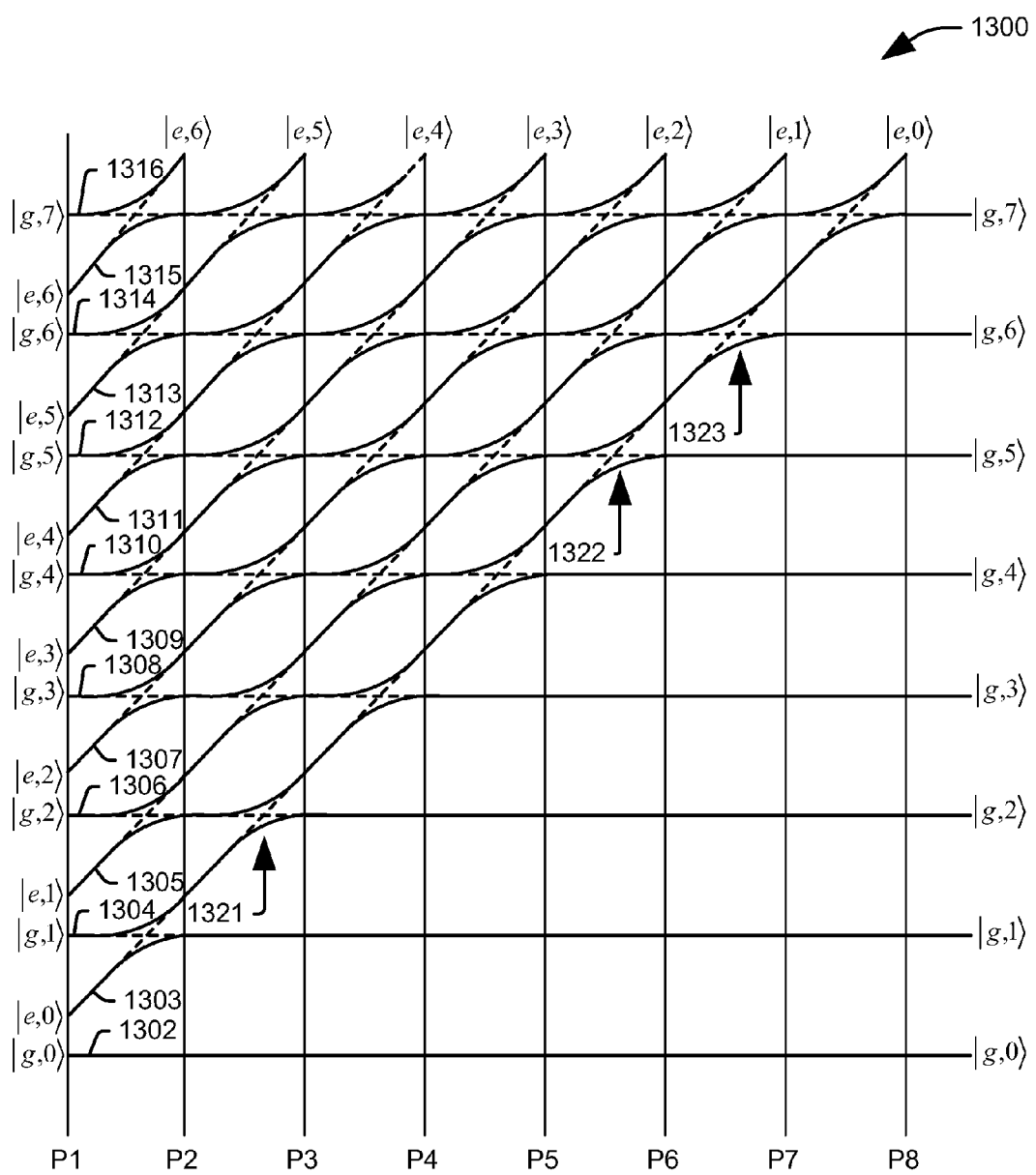
FIG. 13 is an energy diagram illustrating a plurality of energy states of a first quantum circuit having some degree of coupling between a qubit and the resonator.

FIG. 13 is an energy diagram 1300 illustrating a plurality of energy states of a system having some degree of coupling between a qubit and the resonator, with the qubit being coupled to a classical control mechanism. The classical control mechanism has an associated classical control parameter that can be varied among a range of values, represented on the energy diagram 1300 as P1-P8. It will be appreciated that a given system can have a plurality of qubits coupled to a common resonator, but for the purpose of the current discussion, a multiple qubit system can be modeled as a plurality of single qubit-resonator systems, with any state change at the resonator carried over between systems. The energy diagram 1300 includes a plurality of energy states of the qubit-resonator system, denoted by dashed lines and labeled in standard ket format with the state of qubit (i.e., ground or excited) followed by the state of the resonator, given in the number of quanta of energy in the resonator. It will be appreciated that, while the illustrated energy diagram 1300, is provide to facilitate explanation of the systems and methods presented herein, any of a number of quantum logic gates can be implemented with a system represented by the diagram.

To facilitate the description of the various examples of quantum logic operations herein, changes in the energy state of the resonator will be described in terms of adding or removing photons from the resonator, with zero photons representing the lowest energy state of the resonator, and each successive excited state represented by the addition of a photon to the resonator. It will be appreciated that the use of the term "photon" should not be read to imply any particular implementation of the qubit, the resonator, or the classical control parameter. Further, while the methods in accordance with an aspect of the present invention, as presented herein, involve the transition of a qubit-resonator system between states, these states and the transitions between them are most readily described with respect to the individual energy states of the qubit and the resonator, and this convention is followed herein.

In a first set of the plurality of energy states, the qubit is in the ground state, and each state is represented by a horizontal dotted line. In a second set of the plurality of energy states, the qubit is in the excited state, and each state is represented by a diagonal dotted line running from the leftmost boundary of the diagram to the uppermost boundary of the diagram. The diagram 1300 further includes a plurality of adiabatic energy contours 1301-1316 illustrated as solid lines and representing permissible transitions between quantum states of the resonator and the qubit. It will be appreciated that, in accordance with an aspect of the present invention, an adiabatic sweep of the classical control parameter from a first value to a second value will cause a transfer of energy between the qubit and the resonator and a corresponding transition of the quantum state of the coupled qubit-resonator system only when the sweep of the parameter encompasses a permissible transition for the current quantum state of the coupled qubit-resonator system, as illustrated herein. Adiabatic sweeps are therefore referred to herein as "permitting" the quantum state transition, as the actual effect of an adiabatic sweep of the classical control parameter depends entirely on the current state of the system and the initial and final values of the parameter.

In accordance with an aspect of the present invention, the coupled qubit-resonator system demonstrates a plurality of avoided crossings, in which an adiabatic sweep of the classical control parameter causes the effect of the qubit-resonator coupling to dominate, such that the crossing of two states is avoided. This results from a quantum mechanical effect whereby two systems that are coupled together and that have the same energy will not cross energy lines. While a quantum circuit that can be described by the energy diagram 1300 can be utilized for any of a number of quantum gates, for the examples described herein in FIGS. 15-17, three specific avoided crossings are of particular relevance. A first avoided crossing 1321 between the |g, 2> and the |e, 0> states is utilized in the CNOT gate described in FIG. 16, a second avoided crossing 1322 between the |g, 5> and the |e, 0> states is utilized in the pseudo-Fredkin gate operation described in FIG. 17, and a third avoided crossing 1323 between the |g, 6> and the |e, 0> states is utilized in the Toffoli gate operation described in FIG. 17.

Figure 14:
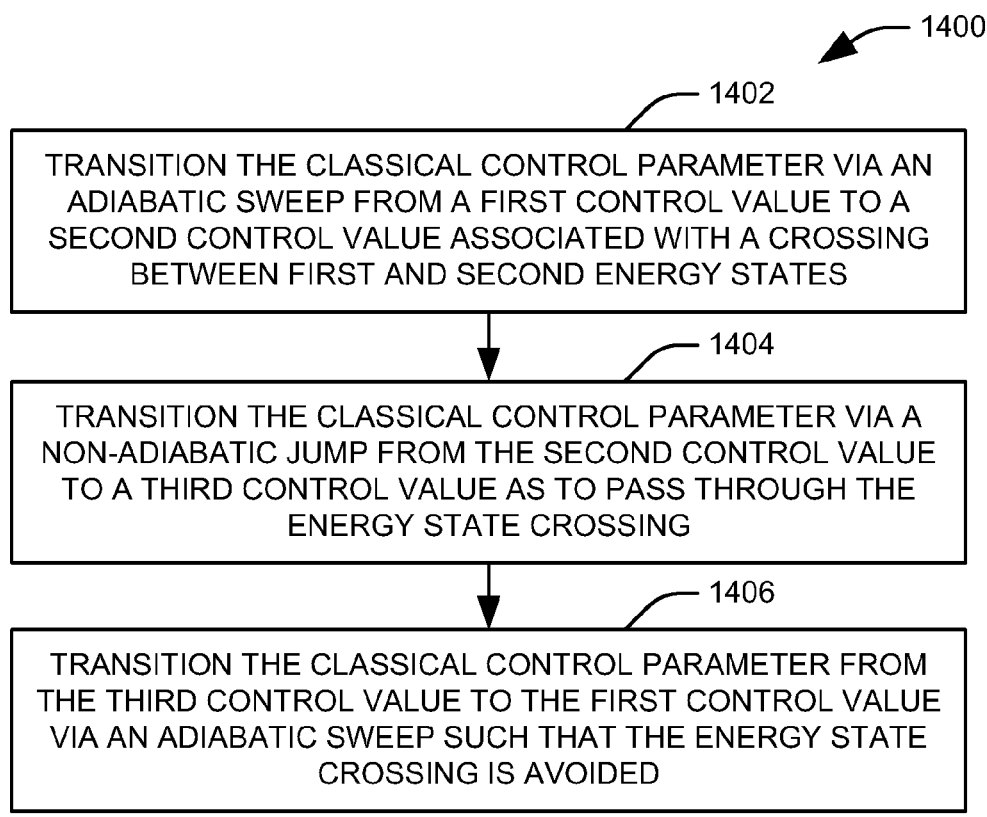
FIG. 14 illustrates an exemplary method for implementing a quantum logic gate in accordance with an aspect of the present invention.

FIG. 14 illustrates an exemplary method 1400 for implementing a quantum logic gate with a quantum circuit having a classical control parameter coupled to a qubit, wherein the qubit is coupled to a resonator by a coupling having a characteristic energy. It will be appreciated that while the individual processes 1402, 1404, and 1406 comprising the method are illustrated in series, they can be performed in any order. The classical control parameter is configured to allow for transitions between a plurality of control values either by adiabatic sweeps, that is, transitions that are slow relative to a characteristic energy of the qubit-resonator system, or jumps, which are transitions that are rapid relative to the characteristic energy of the system. At 1402, the classical control parameter is transitioned from a first control value to a second control value via an adiabatic sweep. The second control value can be selected such that the state of the quantum circuit is transitioned to one of a first energy state and a second energy state associated with a crossing between the first and second energy states.

At 1404, the classical control parameter is transitioned from the second control value to a third control value via a non-adiabatic jump. The third control value can be selected such that the system is transitioned either into the crossing of the first and second energy states or through the crossing. At 1406, the classical control parameter is transitioned via an adiabatic sweep from the third control value to the first control value. In accordance with an aspect of the present invention, the adiabatic sweep avoids the crossing between the first and second energy states, such that if the system was in the first energy state before the sweep of 1406, it will at least transition through the second energy state during the sweep. Specifically, the jump of 1404, while not affecting the energy state of the system directly, causes the system to jump between a first adiabatic energy contour associated with the avoided crossing and a second adiabatic energy contour associated with the avoiding crossing. The cumulative effect of the transitions of 1402, 1404, and 1406 is to transition the system from a first energy state associated with the first adiabatic energy contour to a second energy state associated with the second adiabatic energy contour.

Figures 15A, 15C:
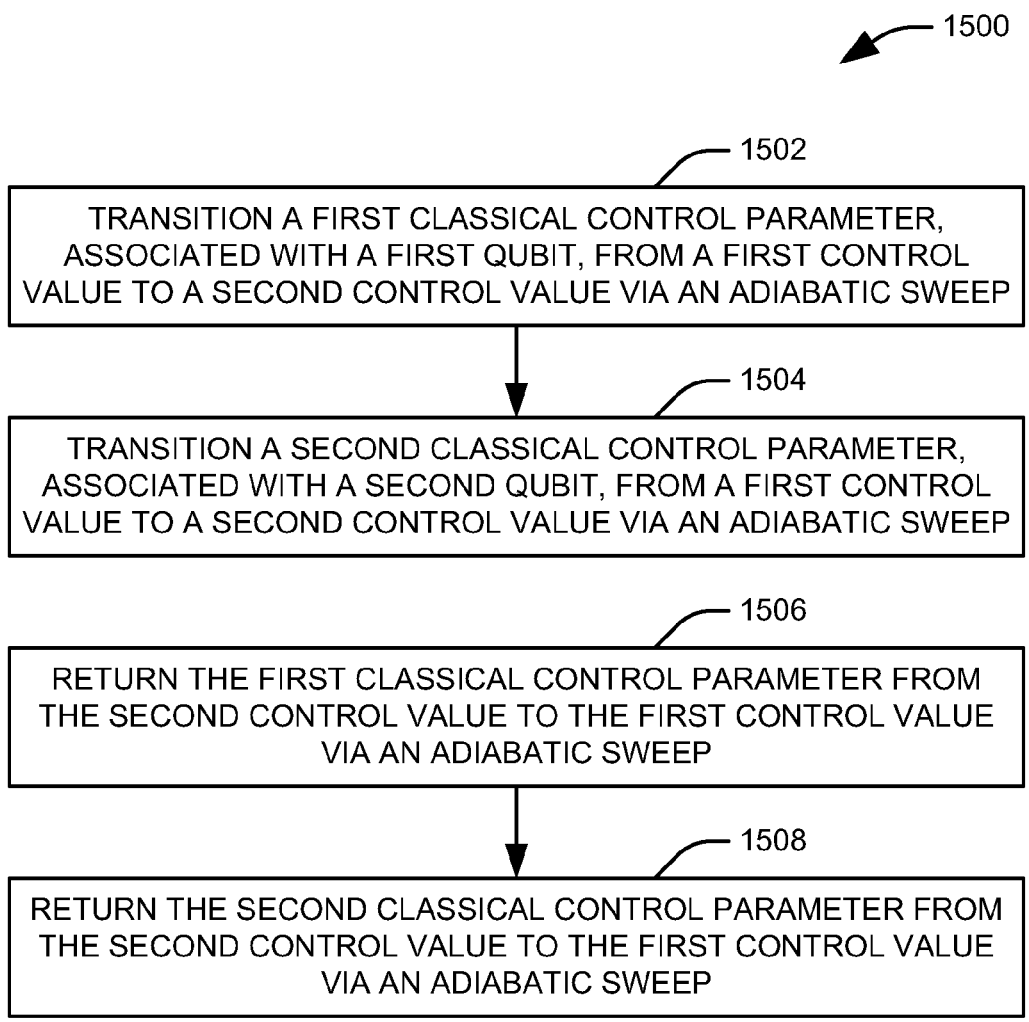
FIG. 15A illustrates an exemplary method for implementing a quantum swap gate in accordance with an aspect of the present invention.
FIG. 15C illustrates an associated energy state of the quantum circuit at various points in the swap gate operation described in FIG. 15A.

FIG. 15A illustrates an exemplary method for implementing a quantum swap gate with a quantum circuit in accordance with an aspect of the present invention. The quantum circuit includes a first classical control parameter coupled to a first qubit and a second classical control parameter coupled to a second qubit, wherein each of the first and second qubits are coupled to a resonator by a coupling having a characteristic energy. A truth table describing the swap gate operation is illustrated as FIG. 15B. In the illustrated method 1500, it is assumed that the energy levels of a given coupled qubit-resonator pair within the quantum circuit can be represented by the energy diagram of FIG. 13. For the purpose of the foregoing explanation, it is assumed that the resonator begins in its lowest energy state, (e.g., with zero photons in the resonator).

At 1502, the value of the first classical control parameter is transitioned from a first control value to a second control value via an adiabatic sweep. For example, the first classical control parameter can be swept from a minimum value, denoted as P1 in FIG. 13, to a target value, denoted as P8. It will be appreciated, however, that this value is merely exemplary and, in practice, the target value can be a value closer to P1 (e.g., P4) to provide the same effect with a smaller transition of the first classical control parameter. Hereinafter, where a target value is given for an adiabatic sweep, it is merely exemplary and one of skill in the art will understand, based on the teachings herein, that any target value sufficient to provide the desired state change can be utilized. The use of an adiabatic sweep allows information to be exchanged between the qubit and the coupled resonator. Accordingly, if the first qubit begins in an excited state, the sweep of 1502 transfers a photon to the resonator to place it in a first excited state and returns the first qubit to a ground state. If the first qubit begins in the ground state, the resonator remains in its lowest energy state.

At 1504, the value of the second classical control parameter is transitioned from a first control value to a second control value via an adiabatic sweep. For example, the first classical control parameter can be swept from a minimum value, denoted as P1 in FIG. 13, to a target value, denoted as P8. In accordance with an aspect of the present invention, the effects of the sweep of the second classical control parameter will vary according to the current state of the resonator as well as the initial state of the second qubit. If the resonator is in a ground state, the sweep of 1504 will act precisely as the sweep of 1502, adding a photon to the resonator to raise it to its first excited state if the second qubit begins in an excited state, and maintaining the resonator in its lowest energy state if the second qubit begins in a ground state. If the resonator already has one photon (i.e., the first qubit began in an excited state), the sweep of 1504 will add a second photon to the resonator if the second qubit begins in the ground state, and add second and third photons to the resonator if the second qubit begins in an excited state. In either case, the second qubit, like the first qubit, will be in the ground state at the end of 1504.

At 1506, the value of the first classical control parameter is transitioned from the second control value back to the first control value via an adiabatic sweep. In adiabatically sweeping the first control parameter back to the first control value, the resonator is transitioned to a lower energy state, such that the resonator drops to the first excited state if in the second or third excited state, and other wise ends in its lowest energy state. Depending on the state of the resonator prior to the sweep of 1506, the exchange of energy between the resonator and the coupled first qubit permitted by the adiabatic transition may place the first qubit in an excited state. As will be appreciated from FIG. 13, the first qubit will end in an excited state when the resonator begins the sweep of 1506 in the first excited state or the third excited state, and the first qubit will end in the ground state when the resonator begins the sweep of 1506 in its lowest energy state or the second excited state.

At 1508, the value of the second classical control parameter is transitioned from the second control value back to the first control value via an adiabatic sweep. Where the resonator is in the first excited state, this adiabatic sweep removes a photon from the resonator to place it in its lowest energy state, and places the second qubit in an excited state. Where the resonator is already in its lowest energy state, neither the resonator nor the second qubit transition from their lowest energy states. FIG. 15C summarizes the transition of the energy state of the system comprising the two qubits commonly coupled to the resonator after each of the transitions of 1502, 1504, 1506, and 1508.

Figures 16A, 16C:
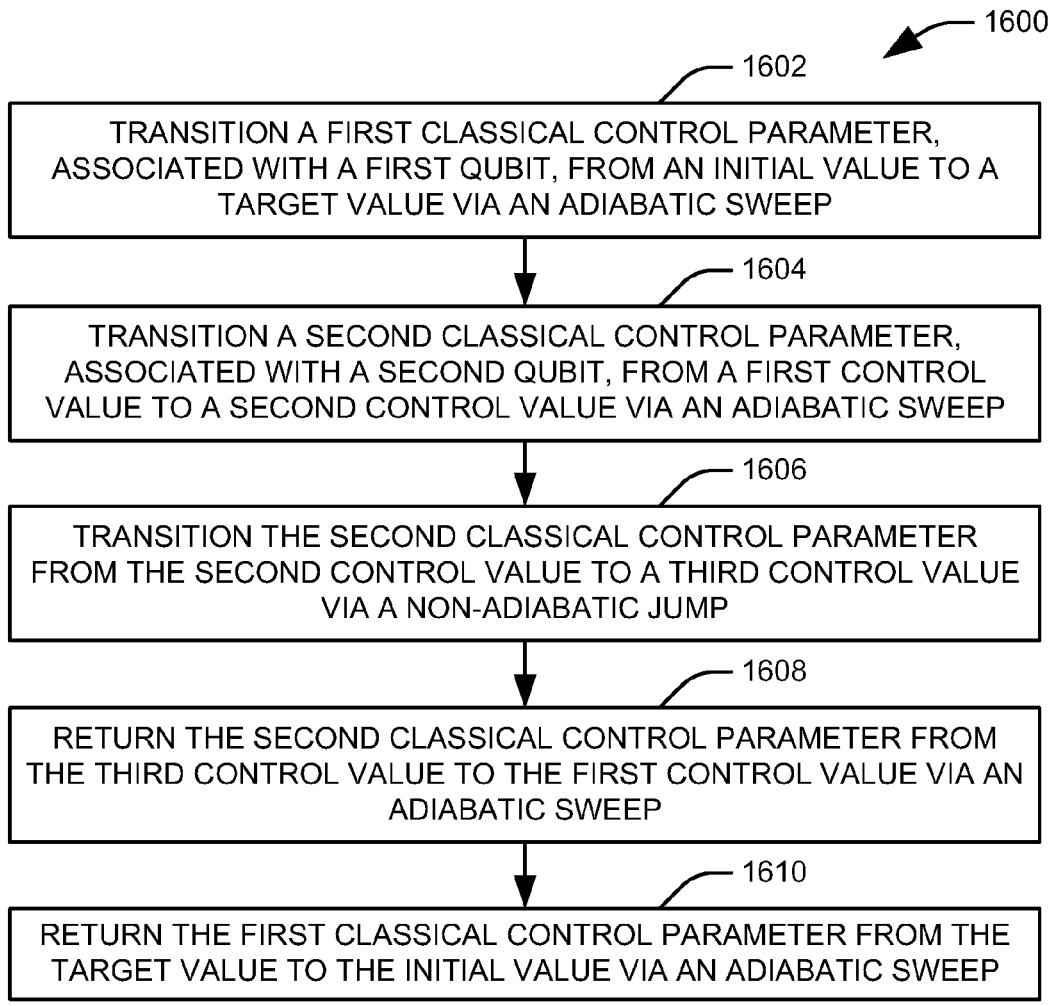
FIG. 16A illustrates an exemplary method for implementing a quantum controlled NOT gate in accordance with an aspect of the present invention.
FIG. 16C illustrates an associated energy state of the quantum circuit at various points in the controlled NOT gate operation described in FIG. 16A.

FIG. 16A illustrates an exemplary method for implementing a quantum controlled NOT gate with a quantum circuit in accordance with an aspect of the present invention. The quantum circuit includes a first classical control parameter coupled to a first qubit and a second classical control parameter coupled to a second qubit, wherein each of the first and second qubits are coupled to a resonator by a coupling having a characteristic energy. For the purpose of the illustrated method 1600, the first qubit serves as a control qubit for a NOT operation on the second qubit. A truth table describing the controlled NOT gate operation is illustrated as FIG. 16B. In the illustrated method 1600, it is assumed that the energy levels of a given coupled qubit-resonator pair within the quantum circuit can be represented by the energy diagram of FIG. 13. For the purpose of the foregoing explanation, it is assumed that the resonator begins in its lowest energy state, represented as |0> in the diagram.

At 1602, the value of the first classical control parameter is transitioned from a first control value to a second control value via an adiabatic sweep. For example, the first classical control parameter can be swept from a minimum value, denoted as P1 in FIG. 13, to a target value, denoted as P8. It will be appreciated that the use of an adiabatic sweep allows information to be exchanged between the qubit and the coupled resonator. Accordingly, if the first qubit begins in an excited state, the sweep of 1602 transfers a photon to the resonator to place it in an excited state and return the first qubit to a ground state. If the first qubit begins in the ground state, the resonator remains in its lowest energy state.

At 1604, the value of the second classical control parameter is transitioned from a first control value to a second control value via an adiabatic sweep. It will be appreciated that the change in the second classical control parameter can be different from the change in the first classical control parameter in 1602. For example, the second classical control parameter can be swept from a minimum value, denoted as P1 in FIG. 13, to a target value, denoted as P2. In accordance with an aspect of the present invention, the effects of the sweep of the second classical control parameter will vary according to the current state of the resonator as well as the initial state of the second qubit.

If the resonator is in a ground state, the sweep of 1604 will act precisely as the sweep of 1602, adding a photon the resonator if the second qubit begins in an excited state, and having no effect on the resonator or the qubit if the second qubit begins in a ground state. If the resonator is in the first excited state, however, the adiabatic sweep will result in some transfer of quantum information between the second qubit and the resonator. For example, if the second qubit began in a ground state, it will transition to an excited state, and the resonator will transition to its lowest energy state. If the second qubit began in an excited state, it will transition to a ground state, and a second photon will be added to the resonator to raise the resonator to a second excited state.

At 1606, the value of the second classical control parameter is rapidly transitioned from the second control value to a third control value. For example, the second classical control parameter can be jumped from its previous value, P2, to a larger value, P3. As has been explained previously, a rapid jump of a classical control parameter does not change the state of the system, such that the state of the second qubit and the resonator are unchanged. If the first qubit began in its ground state, this jump has no practical effect. It will be appreciated from FIG. 13, however, that if the first qubit began in an excited state and the sweep of 1602 caused the resonator to enter its first excited state, the jump from P2 to P3 passes over the crossing point 1321 of the |e, 0> and the |g, 2> energy states.

At 1608, the value of the second classical control parameter is transitioned from the third control value back to the first control value via an adiabatic sweep. Again, if the first qubit began in the ground state, this sweep merely returns the second qubit to its initial value, as the jump of 1608 did not traverse any crossings of energy states, and drops the resonator to the ground state if it is currently in the first excited state. If the first qubit was initially in an excited state, however, the jump of 1606 passed over the crossing 1321 of the |e, 0> and |g, 2> energy states, and the sweep back to the first control value follows the avoided crossing created by the coupling of the second qubit and the resonator. Accordingly, if the second qubit was initially in the ground state, it ends up in the excited state after the sweep, with the resonator falling from the second excited state to the first excited state. If the second qubit was initially in the excited state, it transitions to the ground state after the sweep, and the resonator transitions to the first excited state. The cumulative effect of the transitions of the second classical control parameter at 1604, 1606, and 1608 is to change the state of the second qubit if and only if the first qubit began in the excited state, providing the controlled NOT functionality of the gate. At 1610, the value of the first classical control parameter is transitioned from the second control value back to the first control value via an adiabatic sweep to return the resonator to its lowest energy state, if the resonator is in an excited state. FIG. 16C summarizes the transition of the energy state of the system comprising the two qubits commonly coupled to the resonator after each of the transitions of 1602, 1604, 1606, 1608, and 1610.

Figure 17A:
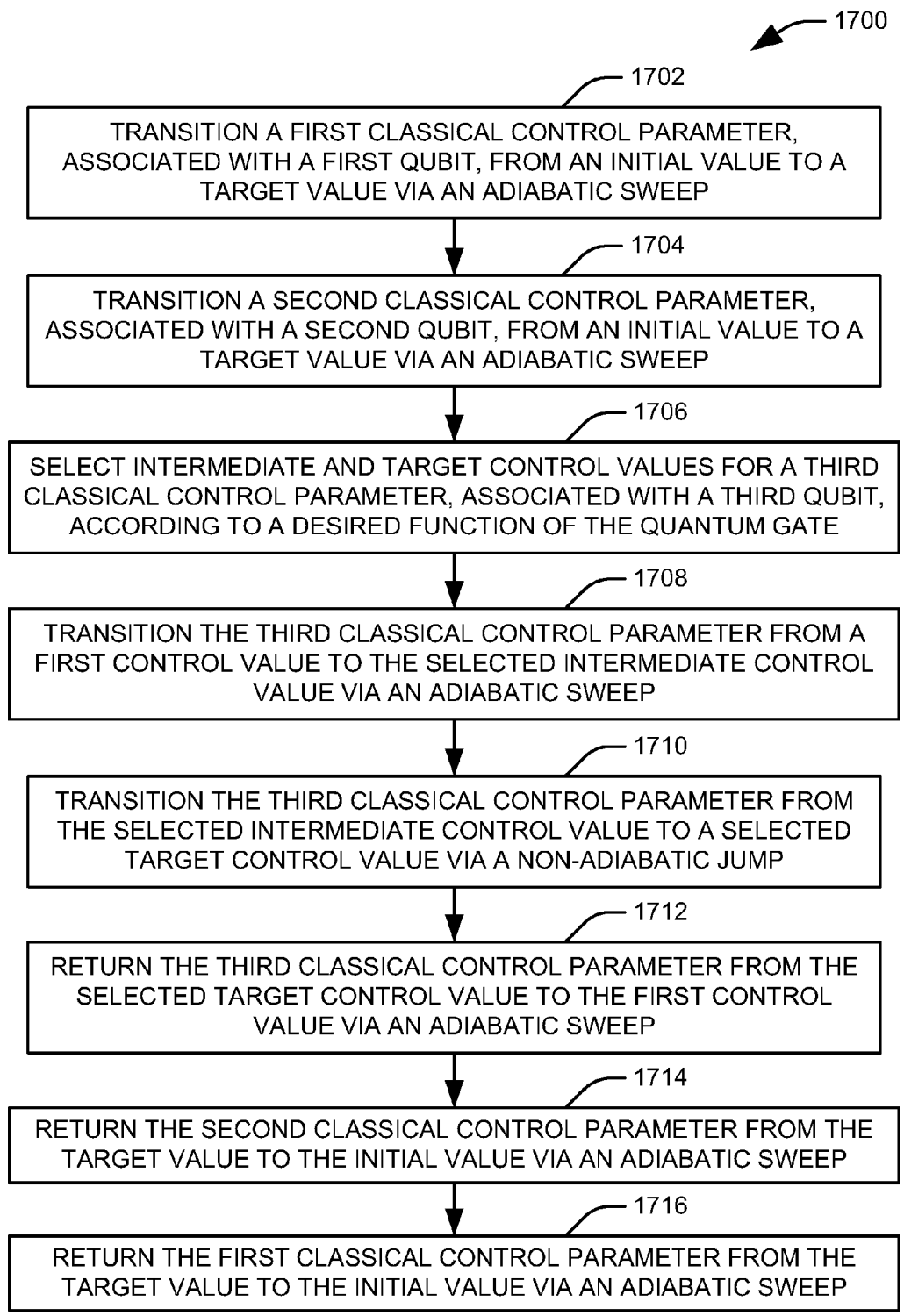
FIG. 17A illustrates an exemplary method for implementing a three-input quantum gate in accordance with an aspect of the present invention.

FIG. 17A illustrates an exemplary method for implementing a quantum gate, capable of operation as either a Toffoli gate or a modified swap gate, with a quantum circuit in accordance with an aspect of the present invention. The quantum circuit comprises a first classical control parameter coupled to a first qubit, a second classical control parameter coupled to a second qubit, and a third classical control parameter coupled to a third qubit wherein each of the first, second, and third qubits are coupled to a resonator by a coupling having a characteristic energy. By a modified swap gate, it is meant that the gate operates as a Fredkin gate, but does not operate correctly if the control qubit and the two target qubits for the swap all begin in the excited state, and is hereinafter referred to as a pseudo-Fredkin gate. A first truth table describing the Toffoli gate operation is illustrated as FIG. 17B, and a second truth table describing the pseudo-Fredkin gate operation is illustrated as FIG. 17C. When the gate operates as a Toffoli gate, the first and second qubits serve as control qubits for a NOT operation on the third qubit. When the gate functions as a pseudo-Fredkin gate, the first qubit serves as a control qubit for a swap operation on the second and third qubits. Further, it is assumed that the energy levels of a given coupled qubit-resonator pair within the quantum circuit can be represented by the energy diagram of FIG. 13. For the purpose of the foregoing explanation, it is assumed that the resonator begins in its lowest energy state, represented as |0> in the diagram.

At 1702, the value of the first classical control parameter is transitioned from a first control value to a second control value via an adiabatic sweep. For example, the first classical control parameter can be swept from a minimum value, denoted as P1 in FIG. 13, to a target value, denoted as P8. If the first qubit begins in an excited state, the sweep of 1702 transfers a photon to the resonator to transition the resonator to an excited state and return the first qubit to a ground state. If the first qubit begins in the ground state, the resonator remains in its lowest energy state.

At 1704, the value of the second classical control parameter is transitioned from a first control value to a second control value via an adiabatic sweep. For example, the first classical control parameter can be swept from a minimum value, denoted as P1 in FIG. 13, to a target value, denoted as P8. If the resonator is in its lowest state, the sweep of 1704 will act precisely as the sweep of 1702, transitioning the resonator to the first excited state if the second qubit begins in an excited state, and maintaining the resonator in its lowest energy state if the second qubit begins in a ground state. If the resonator is in the first excited state (i.e., the first qubit began in an excited state), the resonator will be raised to a second excited state if the second qubit begins in the ground state, and the resonator will be raised to a third excited state if the second qubit begins in an excited state. In either case, the second qubit, like the first qubit, will be in the ground state at the end of 1704.

At 1706, intermediate and final control values are selected according to a desired function of the gate. For example, one set of control values can represent the Toffoli gate with a second set of values representing the pseudo-Fredkin date. For the purposes of the illustrated method 1700, the Toffoli gate utilizes an intermediate value designated as P6 in FIG. 13 and a target value of P7. The pseudo-Fredkin gate utilizes an intermediate value designated as P5, and a target value of P6. At 1708, the value of the third classical control parameter is transitioned from a first control value to the selected intermediate control point via an adiabatic sweep.

After the sweeps of steps 1702 and 1704, the resonator can be in either its lowest state or one of the first three excited states. If the resonator is in a ground state, the sweep of 1708 will act precisely as the sweep of 1702, transitioning the resonator to the first excited state if the second qubit begins in an excited state, and maintaining the resonator in its lowest energy state if the second qubit begins in a ground state. If the resonator is in the first excited state, the adiabatic sweep will end with the third qubit in the ground state, and the resonator will transition to its second excited state if the third qubit began in the ground state and transition to its third excited state if the third qubit began in the excited state.

If the resonator is in the second excited state, the results of the adiabatic sweep depend on the selected control values. If a Toffoli gate operation is being performed, the sweep will end with the third qubit in the ground state, and the resonator will transition to its fourth excited state if the third qubit began in the ground state and transition to its fifth excited state if the third qubit began in the excited state. If a pseudo-Fredkin operation is being performed, the sweep will end with the third qubit in the ground state and the resonator in its fourth excited state if the third qubit began in the ground state. If the third qubit began in the excited state, it remains in the excited state and the resonator transitions to its lowest energy state.

If the resonator is in the third excited state when the sweep of 1708 is performed, indicating that each of the first and second qubits began in the excited state, an exchange of quantum information takes place between the third qubit and the resonator, such that each of the third qubit and the resonator changes states. For the Toffoli gate operation, when the third qubit begins in the ground state, it transitions to the excited state, and the resonator transitions to its ground state.

Where the third qubit begins in the excited state, it transitions to the ground state and the resonator transitions to its sixth excited state. For a valid pseudo-Fredkin gate operation to take place, the third qubit must begin in the ground state if the resonator is in the third excited state after the sweep of 1708, as the pseudo-Fredkin gate requires that at least one qubit begin in the ground state. Accordingly, for the pseudo-Fredkin gate operation, when the resonator begins the sweep of 1708 in the excited state, the third qubit remains in the ground state and the resonator transitions to its fifth excited state At 1710, the value of the third classical control parameter is rapidly transitioned from the intermediate control value to the selected target control value. For example, for the Toffoli gate operation, the third classical control parameter can be jumped from the intermediate control value, P6, to a selected target value, P7, and for the pseudo-Fredkin gate operation, the third classical control parameter can be jumped from P5 to P6. It will be appreciated that the jump operation does not change the state of the qubit-resonator system.

At 1712, the value of the third classical control parameter is sweep from the target control value back to the first control value. Where the Toffoli gate operation is being performed, it will be appreciated from FIG. 13, that the compound operation comprising the sweeps of 1708 and 1712 and the jump of 1710 will have no net effect of the state of the system unless each of the first and second qubits began in the excited state, such that the resonator was in the third excited state before the sweep of 1708. In such a case, after the sweep of 1708, the third qubit and the resonator will be in the $|e, 0\rangle$ state if the third qubit began in the ground state, or the $|g, 6\rangle$ state if the third qubit began in the excited state. The jump of 1710 traverses the crossing 1323 of the $|e, 0\rangle$ and $|g, 6\rangle$ states, such that when the value of the third classical control parameter is swept back at 1712, the resonator returns to its third excited state, but the state of the third qubit will have changed from its initial state. Accordingly, the change in the state of the third qubit occurs only when both the first and second qubits began in an excited state, providing the Toffoli functionality.

Where the pseudo-Fredkin operation is being performed, the compound operation comprising the sweeps of 1708 and 1712 and the jump of 1710 will have no net effect of the state of the system unless at least the first qubit began in the excited state, such that the resonator was in the second or third excited state before the sweep of 1708. This is in accordance with the controlled swap functionality of the gate, as the system will only be in the second or third excited state if the first, control, qubit begins in an excited state. If the resonator was in the second excited state after the sweep of 1708, the third qubit and the resonator will be in the $|e, 0\rangle$ state if the third qubit began in the excited state, or the $|g, 4\rangle$ state if the third qubit began in the ground state. If the resonator was in the third excited state, the third qubit begins the sweep of 1708 in the ground state, and the system transitions to the $|g, 5\rangle$ state.

The jump of 1710 is selected to traverse the crossing 1322 of the $|e, 0\rangle$ and $|g, 5\rangle$ states. Accordingly, if the system is in the $|g, 4\rangle$ state, the jump of 1710 has no practical effect, which is in accordance with the controlled swap functionality, as the third qubit-resonator system will only be in the $|g, 4\rangle$ state if both the second and third qubits began in the ground state, and the swap has no effect. If the system is in either the $|e, 0\rangle$ or the $|g, 5\rangle$ state prior to the jump of 1710, the jump passes through the avoided crossing, such that when the value of the third classical control parameter is swept back at 1712, the cumulative effect of the compound operation represented by the transitions of 1708, 1710, and 1712 on a system beginning the operation in one of the $|e, 2\rangle$ or $|g, 3\rangle$ states is to transition the system to the other of the two states. Accordingly, a swap of the states of the second and third qubits occurs only if the two qubits have different initial values and the control qubit begins in the excited state, approximating the function of a Fredkin gate.

At 1714, the value of the second classical control parameter is transitioned from the second control value back to the first control value via an adiabatic sweep. In adiabatically sweeping the second control parameter back to the first control value, the resonator is transitioned to a lower energy state, such that the resonator drops to the first excited state if in the second or third excited state, and otherwise ends in its lowest energy state. Depending on the state of the resonator prior to the sweep of 1714, the exchange of energy between the resonator and the coupled second qubit permitted by the adiabatic transition may place the second qubit in an excited state. As will be appreciated from FIG. 13, the second qubit will end in an excited state when the resonator begins the sweep of 1714 in the first excited state or the third excited state, and the second qubit will end in the ground state when the resonator begins the sweep of 1714 in its lowest energy state or the second excited state.

At 1716, the value of the first classical control parameter is transitioned from the second control value back to the first control value via an adiabatic sweep. Where the resonator is in the first excited state, this adiabatic sweep removes a photon from the resonator to place it in its lowest energy state, and places the first qubit in an excited state. Where the resonator is already in its lowest energy state, neither the resonator nor the first qubit transition from their lowest energy states. FIG. 17D summarizes the transition of the energy state of the system comprising the three qubits commonly coupled to the resonator after each of the transitions of 1702, 1704, 1708, 1710, 1712, 1714, and 1716 when the Toffoli gate operation is performed. FIG. 17E summarizes the transition of the energy state of the system comprising the three qubits commonly coupled to the resonator after each of the transitions of 1702, 1704, 1708, 1710, 1712, 1714, and 1716 when the pseudo-Fredkin gate operation is performed.

Figures 18A, 18B:
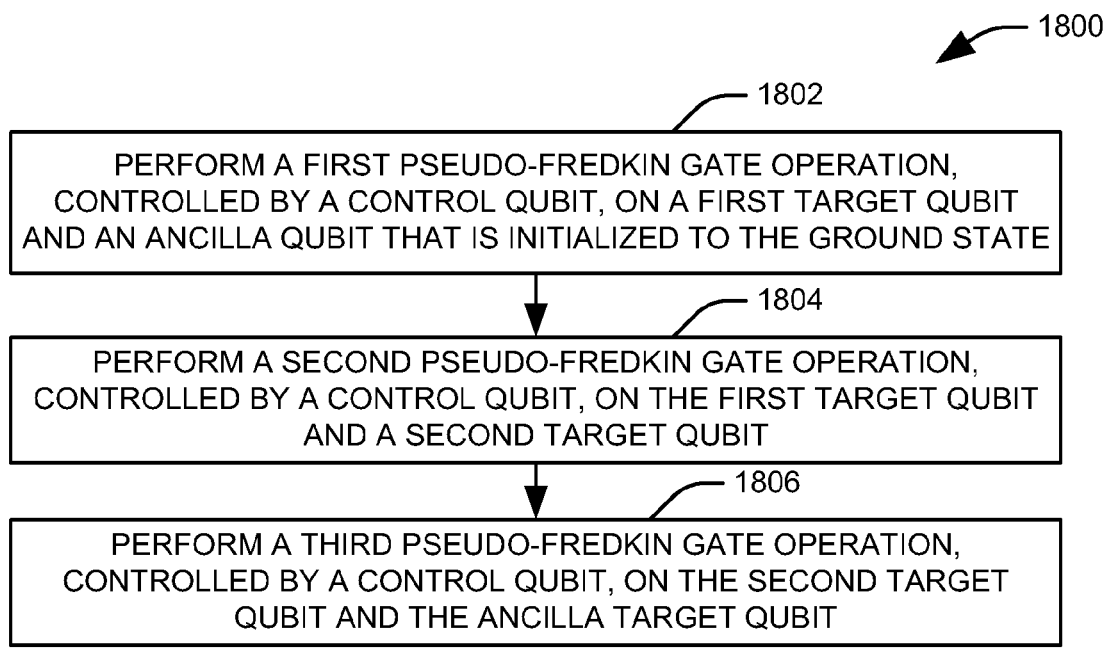
FIG. 18A illustrates a method for providing a Fredkin gate using a series of the pseudo-Fredkin gate operations
FIG. 18B illustrates a truth table describing a Fredkin gate operation that can be performed according to the method of FIG. 18A

FIG. 18A illustrates a method 1800 for implementing a Fredkin gate between a first target qubit and a second target qubit, controlled by a control qubit, as a series of pseudo-Fredkin operations, as described in the method of FIG. 17A. FIG. 18B illustrates a truth table of the Fredkin gate operation. In accordance with an aspect of the present invention, an ancilla qubit, which is always initialized to the ground state, is used to conduct the Fredkin controlled swap operation with the pseudo-Fredkin gates. At 1802, a first pseudo-Fredkin gate operation, controlled by the control qubit, is conducted on the first target qubit and the ancilla qubit. If the control qubit is in the excited state, the first target qubit will be in the ground state and the ancilla qubit will assume the initial state of the first target qubit.

At 1804, a second pseudo-Fredkin gate operation, controlled by the control qubit, is conducted on the first target qubit and the second target qubit. If the control qubit is in the excited state, the second pseudo-Fredkin operation will place the first target qubit in the initial state of the second target qubit, and the second target qubit will be in the ground state. At 1806, a third pseudo-Fredkin gate operation, controlled by the control qubit, is conducted on the second target qubit and the ancilla qubit. If the control qubit is in the excited state, the third pseudo-Fredkin operation will place the second target qubit in the initial state of the first target qubit, and the second target qubit will be in the ground state.

Figure 19:
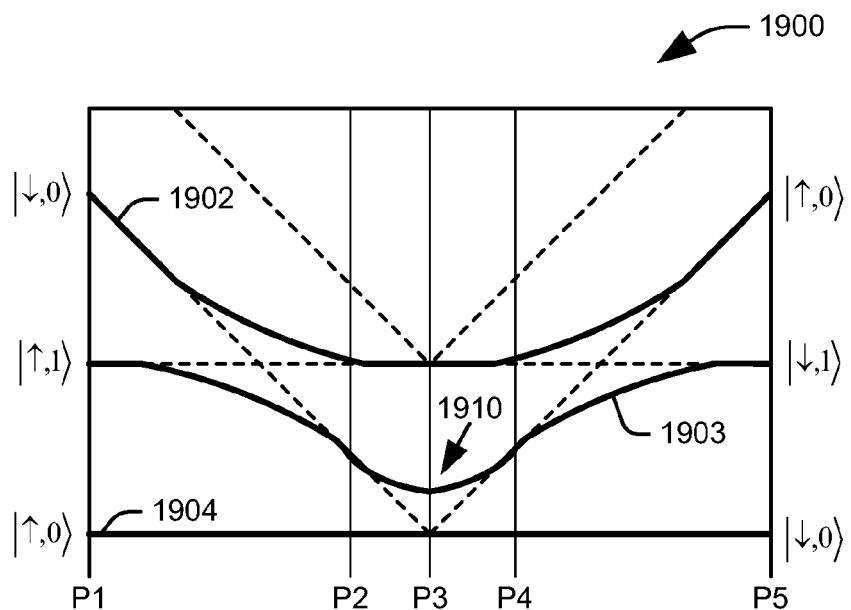
FIG. 19 is an energy diagram illustrating a plurality of energy states of a second quantum circuit having some degree of coupling between a qubit and the resonator.

FIG. 19 is an energy diagram 1900 illustrating a plurality of energy states of a second quantum circuit having some degree of coupling between a qubit and the resonator. It will be appreciated that a given system can have a plurality of qubits coupled to a common resonator, but for the purpose of the current discussion, a multiple qubit system can be modeled as a plurality of single qubit-resonator systems, with any state change at the resonator carried over between systems. In the illustrated system, the qubit is assumed to have two associated states, such that it can be modeled as the state of a spin-½ particle, with associated "spin-up" and "spin-down" states that interact differently with the classical control parameter. It will be appreciated, however, that while, for the purpose of illustration the qubit with terminology consistent with a spin-½ qubit, no limitation on the physical implementation of the qubit, resonator, or classical control mechanism is intended.

The energy diagram 1900 is constructed such that the lowest energy state is always at the bottom of the diagram. It will be appreciated that, in the illustrated implementation, the lowest energy state of the qubit varies with the value of the first classical control parameter, such that the ground state of the qubit is a first state, referred to herein as the spin-up state ($|\uparrow\rangle$), at a first value of the classical control parameter (e.g., P1), a second state, referred to herein as the spin-down state ($|\downarrow\rangle$), at a second value of the classical control parameter (e.g., P5), and a superposition of the spin-up and spin-down states $$\left(\tfrac{1}{\sqrt{2}}\left|\uparrow\right\rangle + \tfrac{1}{\sqrt{2}}\left|\downarrow\right\rangle\right)$$

at a third value of the classical control parameter that is intermediate to the first value and the second value (e.g., P3). Accordingly, each of four relevant energy states of the qubit-resonator system, denoted by dashed lines, are each represented by horizontal lines on a first side of the diagram 1900 in which the state of the qubit represents the ground state, and a diagonal line on a second side of the diagram, in which the state of the qubit represents the excited state. As would be expected, for a pair of energy states having the same state of the resonator, the two states intersect at the point where the classical control parameter assumes a value of P3, where the ground state of the qubit is a superposition of the two states.

The energy diagram 1900 further comprises a plurality of adiabatic energy contours 1902-1904 representing adiabatic transitions between states of the coupled qubit-resonator system. The system demonstrates at least one avoiding crossing 1910, in which an adiabatic sweep of the classical control parameter allows the qubit to change its associated state (e.g., flux state or charge state) without a change in the energy state (e.g., ground or excited), such that the crossing of two energy states is avoided. Effectively, sweeping through the avoided crossing changes the ground state of the qubit from a first qubit state to a second qubit state. In accordance with an aspect of the present invention, the quantum X and Hadamard gates of FIGS. 20 and 21 utilize the illustrated avoided crossing 1910 to perform quantum operations on the resonator.

FIG. 20A illustrates an exemplary method 2000 for implementing a quantum X gate with a quantum circuit having a classical control parameter coupled to a qubit, with the qubit also coupled to a resonator by a coupling having a characteristic energy. A truth table describing the quantum X gate operation is illustrated as FIG. 20B. In the illustrated method 2000, it is assumed that the energy levels of the coupled qubit-resonator pair can be represented by the energy diagram of FIG. 19. For the purpose of the foregoing explanation, it is assumed that the qubit begins in its lowest energy state, represented as the lowest solid line on the diagram. It will be appreciated that the quantum circuit is designed such that the qubit always begins in its ground state and returns to the ground state after the method 2000 is completed.

At 2002, the classical control parameter is transitioned adiabatically from a first control value to a second control value. In one implementation, the first control value is the first value, P1, described above, the second control value is represented in FIG. 19 as P2, and the qubit can be assumed to begin in the spin-up state. For the purpose of illustration, the foregoing discussion will focus on this implementation, but it will be appreciated that the methodology can operate in the same manner with the classical control parameter beginning at the second value, P5, described above, in which case the qubit can be assumed to begin in the spin-down state. If the resonator begins in the lowest energy state, the sweep of 2002 does not change the state of the system. If the resonator initially contains a photon, the sweep of 2002 causes an exchange of quantum information between the qubit and the resonator, placing the qubit in the excited (spin-down) state and placing the resonator in its lowest energy state.

At 2004, the classical control parameter is rapidly transitioned from the second control value to a third control value. In the illustrated implementation, the classical control parameter is jumped from the previous value, P2, to P4. As described previously, rapid transition of the classical control parameter preserve the energy state of the qubit-resonator system. It will be appreciated, however, that while the state of the qubit is not changed by the jump, with the change in the classical control parameter, the spin-down state now represents the lower energy orientation of the qubit and the spin-up state represents the higher energy orientation of the qubit.

At 2006, the classical control parameter is adiabatically transitioned from the third control value back to the first control value. During this sweep, if the qubit is in the spin-down state, which is the lowest energy state at P4, the qubit transitions to the spin-up state during the sweep, remaining in the lowest energy state. If the qubit is in the spin-up state prior to the sweep of 2006, the sweep of 2006 causes an exchange of quantum information between the qubit and the resonator, with the qubit remaining in the spin-up state, an effective transition from an excited state to ground due to the change in the classical control parameter, and the resonator transitions to its first excited state. FIG. 20C illustrates the energy state of the system after each of the transitions of 2002, 2004, and 2006.

FIG. 21 illustrates an exemplary method 2100 for implementing a Hadamard gate with a quantum circuit having a classical control parameter coupled to a qubit, with the qubit also coupled to a resonator by a coupling having a characteristic energy. In the illustrated method 2100, it is assumed that the energy levels of the coupled qubit-resonator pair can be represented by the energy diagram of FIG. 19. For the purpose of the foregoing explanation, it is assumed that the qubit begins in its lowest energy state, represented as the lowest solid line on the diagram. It will be appreciated that the quantum circuit is designed such that the qubit always begins in its ground state and returns to the ground state after the method 2100 is completed.

At 2102, the classical control parameter is transitioned adiabatically from a first control value to a second control value. In one implementation, the first control value is the first value, P1, described above, the second control value is represented in FIG. 19 as P2, and the qubit can be assumed to begin in the spin-up state. For the purpose of illustration, the foregoing discussion will focus on this implementation, but it will be appreciated that the methodology can operate in the same manner with the classical control parameter beginning at the second value, P5, described above, in which case the qubit can be assumed to begin in the spin-down state. If the resonator begins in the lowest energy state, the sweep of 2102 does not change the state of the system. If the resonator initially contains a photon, the sweep of 2102 causes an exchange of quantum information between the qubit and the resonator, placing the qubit in the excited (spin-down) state and placing the resonator in its lowest energy state.

At 2104, the classical control parameter is rapidly transitioned from the second control value to a third control value. In the illustrated implementation, the third control value is equal to the third value, P3, described above such the classical control parameter is jumped from the previous value, P2, to P3. While rapid transition of the classical control parameter preserves the energy state of the qubit-resonator system, it will be appreciated that the jump places the system exactly at a crossing between the $|\uparrow,0\rangle$ and the $|\downarrow,0\rangle$ energy states. Further, with the change in the classical control parameter, the lowest energy state of the system is a state in which the resonator is in its lowest energy state and qubit is in a linear superposition of its two states.

At 2106, the classical control parameter is adiabatically transitioned from the third control value back to the first control value. It will be appreciated that, since the sweep begins within the crossing of two energy states of the qubit-resonator system, specifically the $|\uparrow,0\rangle$ and the $|\downarrow,0\rangle$ states, the sweep allows the system to transition to a superposition of states. The particular initial superposition depends on the state of the system at the time of the sweep, with the system transitioning to $$\frac{|\uparrow,0\rangle+|\downarrow,0\rangle}{\sqrt{2}}$$

at point P2 when the qubit begins the sweep of 2106 in the spin-up state, and to $$\frac{|\uparrow,0\rangle-|\downarrow,0\rangle}{\sqrt{2}}$$

at point P2 when the qubit begins the sweep in the spin-down state. It will be appreciated that quantum operations are linear, such that the effect of the sweep on the superimposed states is the sum of the effect of the sweep on each state. As can be seen from the diagram of FIG. 19, the sweep from P2 to P1 causes no change in the $|\uparrow,0\rangle$ state, but when the system is in the $|\downarrow,0\rangle$ state, the sweep causes a transition to the $|\uparrow,1\rangle$ state. Accordingly, the system ends in a superposition of two states of the system, specifically as $$\frac{|\uparrow,0\rangle+|\uparrow,1\rangle}{\sqrt{2}}$$

the sweep began with the qubit in the spin-up state and $$\frac{|\uparrow,0\rangle-|\uparrow,1\rangle}{\sqrt{2}}$$

when the sweep began with the qubit in the spin-down state. FIG. 21C illustrates the energy state of the system after each of the transitions of 2102, 2104, and 2106.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Having described the invention, we claim:

1. A method for performing a quantum gate operation, comprising:
    transitioning a first control parameter associated with a first qubit coupled to a resonator from a first control value to a second control value via an adiabatic sweep operation to permit a transfer of energy between the first qubit and the resonator that causes a change in the quantum state of the qubit and resonator; and
    transitioning the first control parameter from the second control value to a third control value via a jump operation as to maintain the quantum state of the qubit and resonator.

2. The method of claim 1, further comprising returning the control parameter from the third control value to the first control value via an adiabatic sweep.

3. The method of claim 1, further comprising:
    transitioning a second control parameter associated with a second qubit from a starting value to a target value via an adiabatic sweep; and
    transitioning the second control parameter from the target value to the starting value via an adiabatic sweep.

4. The method of claim 3, further comprising:
    transitioning a third control parameter associated with a third qubit from an initial value to a desired value via an adiabatic sweep; and
    transitioning the third control parameter from the desired value to the initial value via an adiabatic sweep.

5. The method of claim 4, further comprising selecting a pair of values for the second and third control values of the first classical control parameter according to a desired function of the quantum gate, such that a first selected pair of values for the second and third control values provides a Toffoli gate operation and a second selected pair of values for the second and third control values approximates a Fredkin gate operation.

6. The method of claim 1, wherein transitioning the first control parameter from the first control value to the second control value comprises conducting an adiabatic sweep of the first control parameter, and the second control value is selected such that the adiabatic sweep transitions the first qubit and the resonator to a first coupled energy state that crosses a second coupled energy state at an associated avoided crossing, and transitioning the first control parameter from the second control value to the third control value comprises conducting a jump operation that causes the energy state of the system to jump through the avoided crossing.

7. A method for performing a quantum gate operation, comprising:
- transitioning a first classical control parameter associated with a first qubit coupled to a resonator from a first control value to a second control value; and
- transitioning the first classical control parameter from the second control value to the first control value via an adiabatic sweep operation, as to permit a transfer of energy between the first qubit and the resonator that causes a change in the quantum state of the qubit and resonator.

8. The method of claim 7, wherein transitioning the first classical control parameter from the first control value to the second control value comprises transitioning the first classical control parameter from the first control value to an intermediate control value via one of an adiabatic sweep operation and a non-adiabatic jump operation, and transitioning the first classical control parameter from the intermediate control value to the second control value via the other of the adiabatic sweep operation and the non-adiabatic jump operation.

9. The method of claim 7, the quantum gate operation comprising a quantum X-gate operation, and transitioning the first classical control parameter comprising transitioning the first classical control parameter via an adiabatic sweep operation to a third control value, associated with an avoided crossing of two energy states of the coupled first qubit and resonator, and transitioning the first classical control parameter from the third control value to the second control value via a non-adiabatic jump operation such that the energy state of the coupled first qubit and resonator jumps through the avoided crossing.

10. The method of claim 7, the quantum gate operation comprising a Hadamard gate operation, wherein transitioning the first classical control parameter comprising transitioning the first classical control parameter via an adiabatic sweep operation to an intermediate control value, associated with an avoided crossing of two energy states of the coupled first qubit and resonator, and transitioning the first classical control parameter from the intermediate control value to the second control value via a non-adiabatic jump operation such that the energy state of the coupled first qubit and resonator jumps to the intersection of the two energy states within the avoiding crossing.

11. The method of claim 7, the quantum gate operation comprising a swap operation on the first qubit and a second qubit coupled to the resonator and having an associated second classical control parameter, and transitioning the first classical control parameter from the first control value to the second control value comprising adiabatically sweeping the first classical control parameter from the first control value to the second control value, the method further comprising:
- transitioning the second classical control parameter from a starting value to a target value via an adiabatic sweep while the first classical control parameter is at the second control value; and
- returning the second control parameter from the target value to the starting value via an adiabatic sweep after the first classical control parameter has been returned to the first control value.

12. The method of claim 7, the quantum gate operation comprising a controlled NOT operation on the first qubit that is controlled by a second qubit coupled to the resonator and having an associated second classical control parameter, and transitioning the first classical control parameter from the first control value to the second control value comprising adiabatically sweeping the first classical control parameter from the first control value to a third control value, intermediate to the first control value and the second control value, and non-adiabatically jumping the first classical control parameter from the third control value to the second control value, the method further comprising:
- transitioning the second classical control parameter from a starting value to a target value via an adiabatic sweep prior to sweeping the first control parameter from the first control value to the third control value; and
- returning the second classical control parameter from the target value to the starting value via an adiabatic sweep after the first classical control parameter has been returned to the first control value.

13. The method of claim 7, wherein transitioning the first classical control parameter from the first control value to the second control value comprises adiabatically sweeping the first classical control parameter from the first control value to a third control value, intermediate to the first control value and the second control value, and non-adiabatically jumping the first classical control parameter from the third control value to the second control value, the method further comprising:
- transitioning each of a second classical control parameter, associated with a second qubit coupled to the resonator, and a third classical control parameter, associated with a third qubit coupled to the resonator, from a starting value to a target value via an adiabatic sweep prior to sweeping the first control parameter from the first control value to the third control value; and
- returning each of the second classical control parameter and the third classical control parameter from the target value to the starting value via an adiabatic sweep after the first classical control parameter has been returned to the first control value.

14. The method of claim 13, the quantum gate operation comprising a Toffoli gate operation on the first qubit that is controlled by the second and third qubits.

15. The method of claim 13, the quantum gate operation comprising a modified controlled swap operation on the first qubit and the second qubit that is controlled by the third qubit.

16. A method for conducting a Fredkin gate operation, controlled by a control qubit, between a first target qubit and a second target qubit as a series of modified controlled swap operations, comprising:
- conducting a first iteration of the method of claim 15, wherein the first qubit is the first target qubit, the second qubit is an ancilla qubit that is configured to begin the Fredkin gate operation in a ground state, and the third qubit is the control qubit;
- conducting a second iteration of the method of claim 15, wherein the first qubit is the first target qubit, the second qubit is the second target qubit, and the third qubit is the control qubit; and
- conducting a third iteration of the method of claim 15, wherein the first qubit is the ancilla qubit, the second qubit is the second target qubit, and the third qubit is the control qubit.

17. A method for performing a quantum gate operation, comprising:
- adiabatically sweeping a first classical control parameter associated with a first qubit, the first qubit being coupled to a resonator, from a first control value to a second control value, such that the coupled first qubit and resonator enter a quantum state associated with a first energy state of a crossing of the first energy state and a second energy state;
- jumping the first classical control parameter from the second control value to a third control value such that the quantum state of the coupled first qubit and resonator jumps through the crossing of the first and second energy states, but remains in the first energy state; and transitioning the first classical control parameter from the third control value to the first control value via an adiabatic sweep operation, such that the quantum state of the coupled first qubit and resonator avoids the crossing of the first and second energy states and transitions to the second energy state.

18. The method of claim 17, the quantum gate operation comprising an X-gate operation on the resonator, and the first energy state representing a first state of the qubit and a lowest energy state of the resonator and the second energy state representing a second state of the qubit and a lowest energy state of the resonator.

19. The method of claim 17, the quantum gate operation comprising a controlled NOT operation on the first qubit that is controlled by a second qubit coupled to the resonator and having an associated second classical control parameter, one of the first and second energy states representing an excited state of the first qubit and a lowest energy state of the resonator and the other of the first and second energy states representing a ground state of the qubit and a second excited state of the resonator, the method further comprising:

transitioning the second classical control parameter from a starting value to a target value via an adiabatic sweep prior to sweeping the first control parameter from the first control value to the second control value; and returning the second classical control parameter from the target value to the starting value via an adiabatic sweep after the first classical control parameter has been returned to the first control value.

20. The method of claim 17, the quantum gate operation comprising a Toffoli gate operation on the first qubit that is controlled by a second qubit, coupled to the resonator and having an associated second classical control parameter, and a third qubit, coupled to the resonator and having an associated third classical control parameter, one of the first and second energy states representing an excited state of the first qubit and a lowest energy state of the resonator and the other of the first and second energy states representing a ground state of the qubit and a sixth excited state of the resonator, the method further comprising:

transitioning each of the second classical control parameter and the third classical control parameter from a starting value to a target value via an adiabatic sweep prior to sweeping the first control parameter from the first control value to the third control value; and returning each of the second classical control parameter and the third classical control parameter from the target value to the starting value via an adiabatic sweep after the first classical control parameter has been returned to the first control value.

21. The method of claim 17, the quantum gate operation comprising a modified controlled swap operation on the first qubit and a second qubit, coupled to the resonator and having an associated second classical control parameter, that is controlled a third qubit, coupled to the resonator and having an associated third classical control parameter, one of the first and second energy states representing an excited state of the first qubit and a lowest energy state of the resonator and the other of the first and second energy states representing a ground state of the qubit and a fifth excited state of the resonator, the method further comprising:

transitioning each of the second classical control parameter and the third classical control parameter from a starting value to a target value via an adiabatic sweep prior to sweeping the first control parameter from the first control value to the third control value; and returning each of the second classical control parameter and the third classical control parameter from the target value to the starting value via an adiabatic sweep after the first classical control parameter has been returned to the first control value.

22. A quantum logic gate comprising:

a resonator;

a qubit coupled to the resonator, with a coupling between the qubit and the resonator having a characteristic energy;

a classical control mechanism coupled to the qubit to adjust a quantum state of the qubit by adjusting a value of a classical control parameter associated with the qubit, such that transitioning the classical control parameter slowly relative to the characteristic energy permits a transfer of energy between the qubit and the resonator, and a rapid transition of the classical control parameter relative to the characteristic energy preserves the quantum states of each of the qubit and the resonator.

23. The quantum logic gate of claim 22, the classical control mechanism being configured to perform a first transition of the classical control parameter from a first value to a second value and a second, slow transition of the classical control parameter from the second value to the first value.

24. The quantum logic gate of claim 22, the classical control mechanism being configured to transition the classical control parameter from a first value to a second value by transitioning the classical control parameter from the first value to an intermediate value via one of a rapid transition and a slow transition and transitioning the classical control parameter from the intermediate value to the second value via the other of the rapid transition and the slow transition.

* * * * *